US011183726B2

(12) United States Patent
Fees et al.

(10) Patent No.: US 11,183,726 B2
(45) Date of Patent: Nov. 23, 2021

(54) CLAMPING BAR HOLDER COMPONENT FOR A BATTERY MODULE AND METHOD THEREOF

(71) Applicant: InEVit LLC, Santa Clara, CA (US)

(72) Inventors: Heiner Fees, Bietigheim-Bissingen (DE); Andreas Track, Sachsenheim (DE); Ralf Maisch, Abstatt (DE); Alexander Eichhorn, Eppingen (DE)

(73) Assignee: TIVENI MERGECO, INC., Redwood City, CA (US)

( * ) Notice: Subject to any disclaimer, the term of this patent is extended or adjusted under 35 U.S.C. 154(b) by 636 days.

(21) Appl. No.: 15/843,082

(22) Filed: Dec. 15, 2017

(65) Prior Publication Data

US 2019/0189980 A1    Jun. 20, 2019

(51) Int. Cl.
*H01M 50/20* (2021.01)
*B60K 1/04* (2019.01)
*B60R 16/04* (2006.01)

(52) U.S. Cl.
CPC ............ *H01M 50/20* (2021.01); *B60K 1/04* (2013.01); *B60R 16/04* (2013.01);
(Continued)

(58) Field of Classification Search
CPC .... B60K 2001/0422; B60K 2001/0461; B60K 2001/0494; B60K 1/04; B60R 16/04;
(Continued)

(56) References Cited

U.S. PATENT DOCUMENTS

| 389,704 | A | * | 9/1888 | Holland | .............. | E05B 65/0864 |
| | | | | | | 292/149 |
| 890,062 | A | * | 6/1908 | Johnson | .................. | F16J 13/08 |
| | | | | | | 292/256 |

(Continued)

FOREIGN PATENT DOCUMENTS

| CA | 2854682 | A1 | * | 5/2013 | ............... | B60K 1/04 |
| CA | 2868641 | A1 | * | 10/2013 | ............ | H01M 50/20 |

(Continued)

OTHER PUBLICATIONS

DE102012202164 English Translation—Description (Year: 2013).*
(Continued)

*Primary Examiner* — Steve Clemmons
(74) *Attorney, Agent, or Firm* — Muncy, Geissler, Olds & Lowe, P.C.; Daniel Podhajny

(57) ABSTRACT

In an embodiment, a clamping bar holder component configured to be secured to an endplate of a battery module includes a plurality of clamping bar holders configured to hold a respective plurality of clamping bars and to facilitate transitions of each of the plurality of clamping bars between a parked state and an unparked state. In the parked state, each clamping bar is secured by a respective clamping bar holder inside of a respective clearance threshold so as to permit the battery module to be inserted into a battery module compartment and/or to be removed from the battery module compartment. In the unparked state, each clamping bar extends out of the clamping bar holder past the clearance threshold so as to block removal of the battery module from the battery module compartment.

22 Claims, 35 Drawing Sheets

(52) U.S. Cl.
CPC ........... *B60K 2001/0422* (2013.01); *B60K 2001/0461* (2013.01); *B60K 2001/0494* (2013.01); *H01M 2220/20* (2013.01)

(58) Field of Classification Search
CPC .. H01M 50/20; H01M 50/271; H01M 50/262; H01M 50/264; H01M 50/249; F16B 2/185; F16B 41/002; E05C 5/00; E05C 2005/005
See application file for complete search history.

(56) References Cited

U.S. PATENT DOCUMENTS

| | | | | |
|---|---|---|---|---|
| 3,799,063 | A * | 3/1974 | Reed | B60K 1/04 104/34 |
| T100,803 | I4 * | 7/1981 | Morrow | E05C 19/08 292/285 |
| 4,838,589 | A * | 6/1989 | DiAmico | E05B 17/0025 16/220 |
| 10,371,181 | B1 * | 8/2019 | Reibling | F16B 5/0635 |
| 2004/0000205 | A1 * | 1/2004 | Cherry | E05C 9/02 74/89.23 |
| 2004/0069024 | A1 * | 4/2004 | Hauer | E05C 5/00 70/167 |
| 2008/0314662 | A1 * | 12/2008 | Bogelein | B60K 1/04 180/68.5 |
| 2010/0114762 | A1 * | 5/2010 | Ishii | H01M 2/305 705/40 |
| 2010/0155164 | A1 * | 6/2010 | Shinoda | B60K 1/04 180/68.5 |
| 2012/0073888 | A1 * | 3/2012 | Taneda | B60K 1/04 180/68.5 |
| 2013/0295437 | A1 * | 11/2013 | Kreutzer | H01M 2/1083 429/159 |
| 2014/0166381 | A1 * | 6/2014 | Ling | B60K 1/04 180/68.5 |
| 2016/0056431 | A1 * | 2/2016 | Subramanian | H01M 10/04 429/149 |
| 2016/0333609 | A1 * | 11/2016 | VanDeMark | E05B 17/0025 |
| 2018/0118174 | A1 * | 5/2018 | Moskowitz | B60L 53/14 |
| 2018/0130983 | A1 * | 5/2018 | Tessier | B60K 1/04 |
| 2019/0048920 | A1 * | 2/2019 | Eichhorn | F16B 41/002 |
| 2019/0255957 | A1 * | 8/2019 | Milton | B60L 50/64 |

FOREIGN PATENT DOCUMENTS

| | | | | |
|---|---|---|---|---|
| DE | | 2657225 A1 * | 6/1977 | ............. B60L 50/66 |
| DE | | 102012202164 A1 | 8/2013 | |
| WO | WO-2015045981 A1 * | | 4/2015 | ............. H01M 50/20 |

OTHER PUBLICATIONS

DE102012202164 English Translation—Claims (Year: 2013).*
International Search Report and Written Opinion dated Jan. 30, 2019 re International Application No. PCT/US2018/055882.

* cited by examiner

CLAMPING BAR HOLDER COMPONENT FOR A BATTERY MODULE AND METHOD THEREOF

BACKGROUND

1. Field of the Disclosure

Embodiments relate to a clamping bar holder component for a battery module and method thereof.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to a clamping bar holder component configured to be secured to an endplate of a battery module of an energy storage system, including a plurality of clamping bar holders configured to hold a respective plurality of clamping bars and to facilitate transitions of each of the plurality of clamping bars between a parked state and an unparked state, wherein, in the parked state, each clamping bar is secured by a respective clamping bar holder inside of a respective clearance threshold so as to permit the battery module to be inserted into a battery module compartment and/or to be removed from the battery module compartment, and wherein, in the unparked state, each clamping bar extends out of the clamping bar holder past the clearance threshold so as to block removal of the battery module from the battery module compartment.

Another embodiment is directed to a method of inserting a battery module into a battery module compartment, including configuring a clamping bar holder component that is secured to an endplate of the battery module such that a plurality of clamping bars are held in a plurality of clamping bar holders in a parked state, wherein the parked state for each clamping bar is characterized by the clamping bar being secured by a respective clamping bar holder inside of a respective clearance threshold so as to permit the battery module to be inserted into a battery module compartment and/or to be removed from the battery module compartment, inserting the battery module into the battery module compartment while each clamping bar remains in the parked state, and transitioning, after the inserting, each clamping bar from the parked state to the unparked state, wherein the unparked state for each clamping bar is characterized by the clamping bar extending out of a respective clamping bar holder past the clearance threshold so as to block removal of the battery module from the battery module compartment.

Another embodiment is directed to a method of removing a battery module from a battery module compartment, including configuring, while the battery module is inserted in the battery module compartment, a clamping bar holder component that is secured to an endplate of the battery module such that a plurality of clamping bars are held in a plurality of clamping bar holders in an unparked state, wherein the unparked state for each clamping bar is characterized by the clamping bar extending out of a respective clamping bar holder past a respective clearance threshold so as to block removal of the battery module from the battery module compartment, transitioning each clamping bar from the unparked state to the parked state, wherein the parked state for each clamping bar is characterized by the clamping bar being secured by a respective clamping bar holder inside of the respective clearance threshold so as to permit the battery module to be inserted into a battery module compartment and/or to be removed from the battery module compartment, and removing the battery module from the battery module compartment after the transitioning.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1:
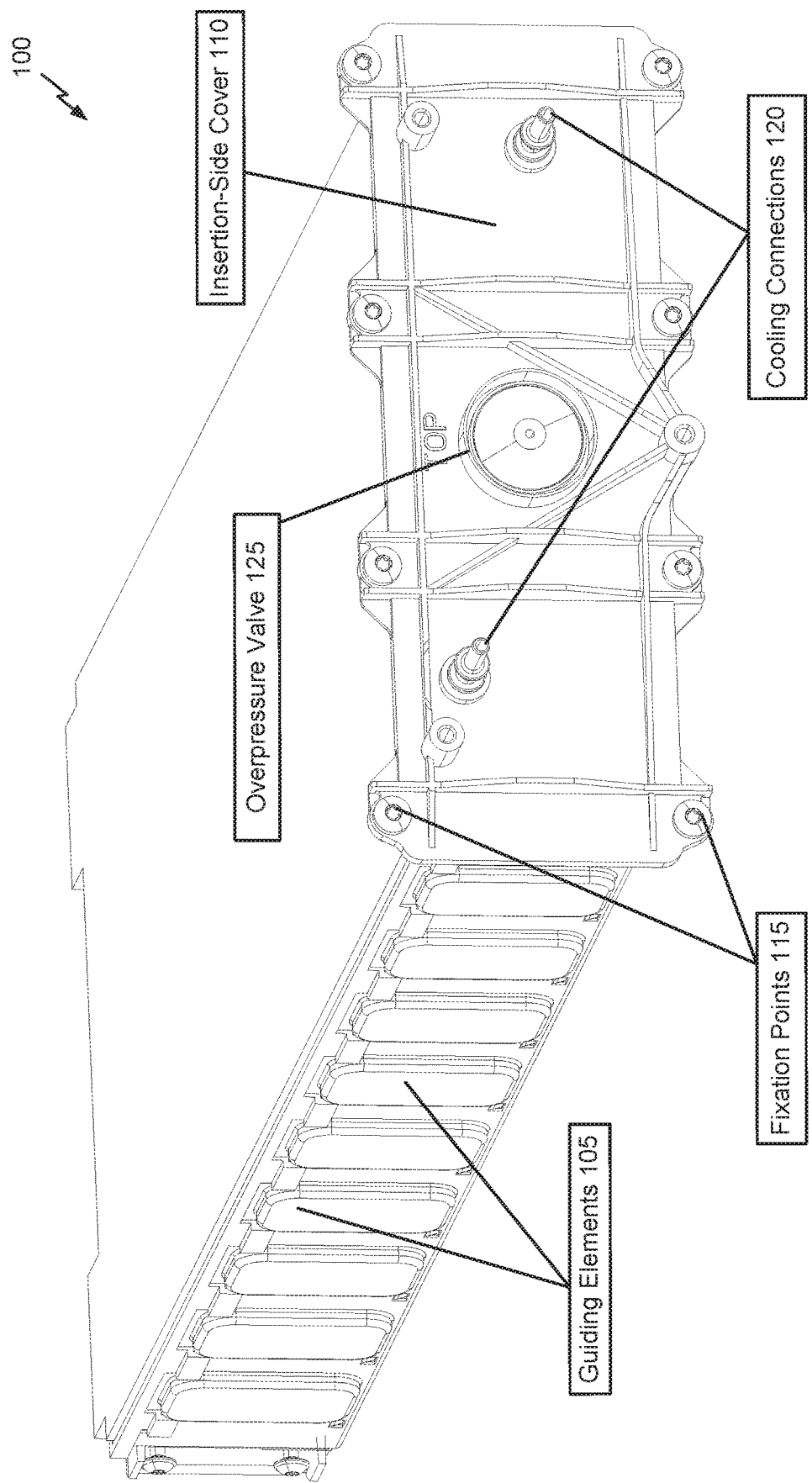
FIG. 1 illustrates an isometric front-perspective of an exterior framing of a battery module in accordance with an embodiment of the disclosure.

FIG. 1 illustrates an isometric front-perspective of an exterior framing of a battery module 100 in accordance with an embodiment of the disclosure. In the example of FIG. 1, the battery module 100 is configured for insertion into a battery module compartment. For example, in FIG. 1, each side of the battery module 100 includes guiding elements 105 to facilitate insertion into (and/or removal out of) the battery module compartment. In a further example, the guiding elements 105 are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, which are provisioned on respective flange sections of the battery module 100) to seal the battery module 100 inside the battery module compartment using a cover (or endplate) integrated sealing system (e.g., rubber ring, paper gasket, sealant adhesive, etc.). While the insertion-side cover 110 is depicted in FIG. 1 as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIG. 1, the insertion-side cover 110 includes fixation points 115 provisioned on respective flange sections (e.g., sections of the battery module that protrude out from the frame of the battery module 100), a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100).

Figure 2:
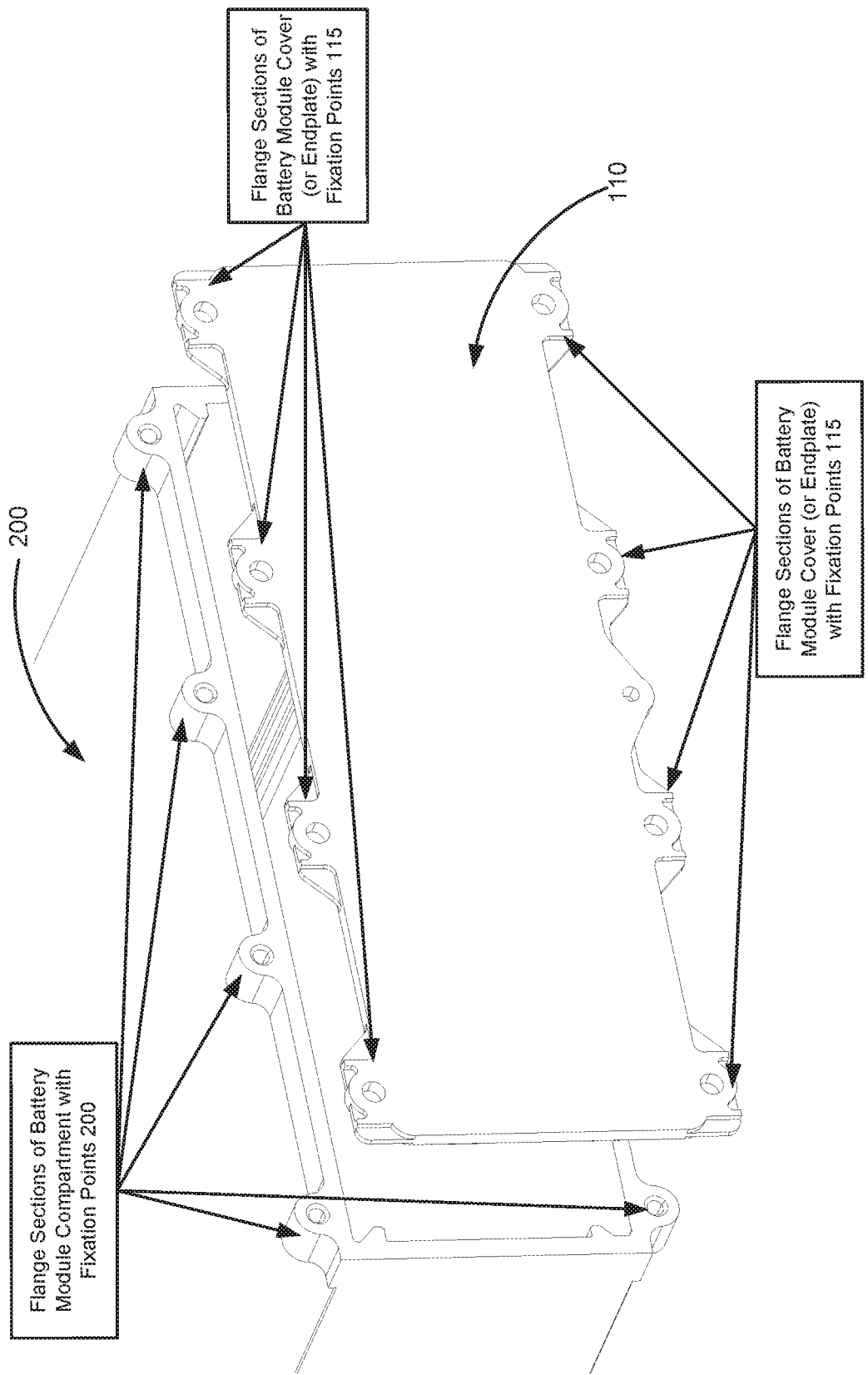
FIG. 2 depicts the insertion-side cover of the battery module of FIG. 1 being aligned with a battery module compartment in accordance with an embodiment of the disclosure.

FIG. 2 depicts the insertion-side cover 110 of the battery module 100 being aligned with a battery module compartment 200 in accordance with an embodiment of the disclosure. In particular, the fixation points 115 on the respective flange sections of the battery module 100 are aligned with fixation points 205 on respective flange sections of the battery module compartment 200. So, once the battery module 100 is inserted into the battery module 200, the fixation points 115 and 205 are bolted together to secure (and seal) the battery module 100 inside the battery module compartment 200.

Figure 3:
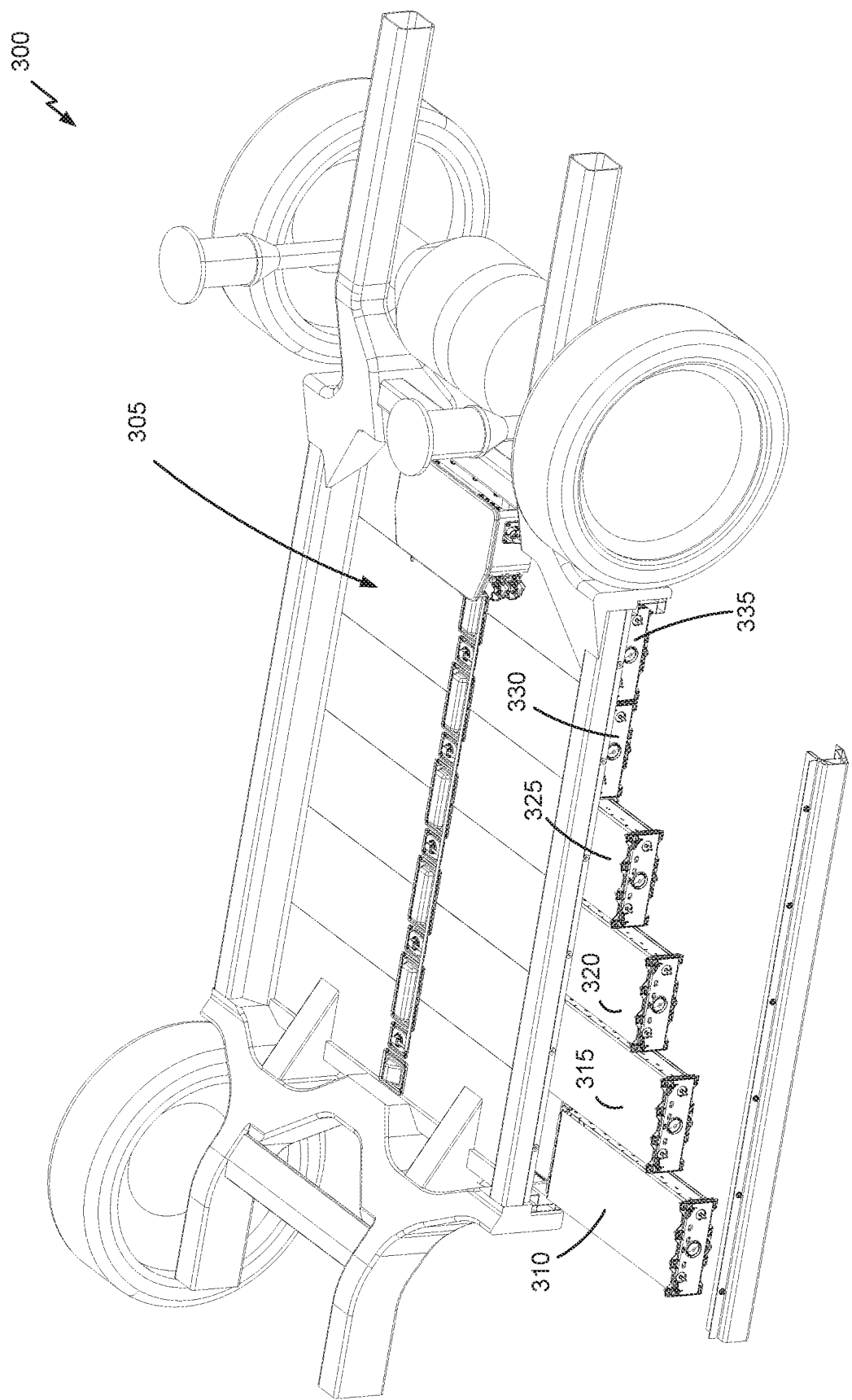
FIG. 3 illustrates an electric vehicle that configured with a battery module mounting area configured with battery module compartments that permit lateral insertion of respective battery modules in accordance with an embodiment of the disclosure.

FIG. 3 illustrates an electric vehicle 300 that configured with a battery module mounting area 305 configured with battery module compartments that permit lateral insertion of respective battery modules in accordance with an embodiment of the disclosure. More specifically, battery modules may be inserted into respective battery module compartments on both left and right sides of the electric vehicle 300.

Referring to FIG. 3, the battery module mounting area 305 includes, on a left side of the electric vehicle 300, battery module compartments configured to receive battery modules 310-335 via left-side lateral insertion. In FIG. 3, battery modules 310-325 are shown at different degrees of lateral insertion, while battery modules 330-335 are shown in a fully-inserted state. While not shown explicitly in FIG. 3, the battery module mounting area 305 may further include, on a right side of the electric vehicle 300, battery module compartments configured to receive other battery modules via right-side lateral (or side) insertion. More specifically, the insertion-sides of the battery modules 310-335 correspond to the left exterior-facing lateral side of each respective battery module compartment on the left side (longitudinally) of the electric vehicle 300, and the insertion-sides of the battery modules of each respective battery module compartment on the right side (longitudinally) correspond to the right exterior-facing lateral side of the electric vehicle 300. Each battery module in FIG. 3 is shown as including the insertion-side cover 110 of FIGS. 1-2, which uses fixation points 115 provisioned in flange sections to be secured onto a respective battery module compartment.

Various embodiments of the disclosure described herein relate to reducing a vertical footprint (i.e., a height in a Z direction) of an insertion-side cover that is used to secure (or provide fixation of) of a battery module inside of a battery module compartment. As will be described below, instead of bolting fixation points arranged on flange sections of an insertion-side cover directly to corresponding fixation points arranged on flange sections of the battery module compartment as described above with respect to FIGS. 1-3, fixation points are defined in the insertion-side cover which cause contact pressure to be applied between the an endplate of the battery module and the battery module compartment.

Figure 4A:
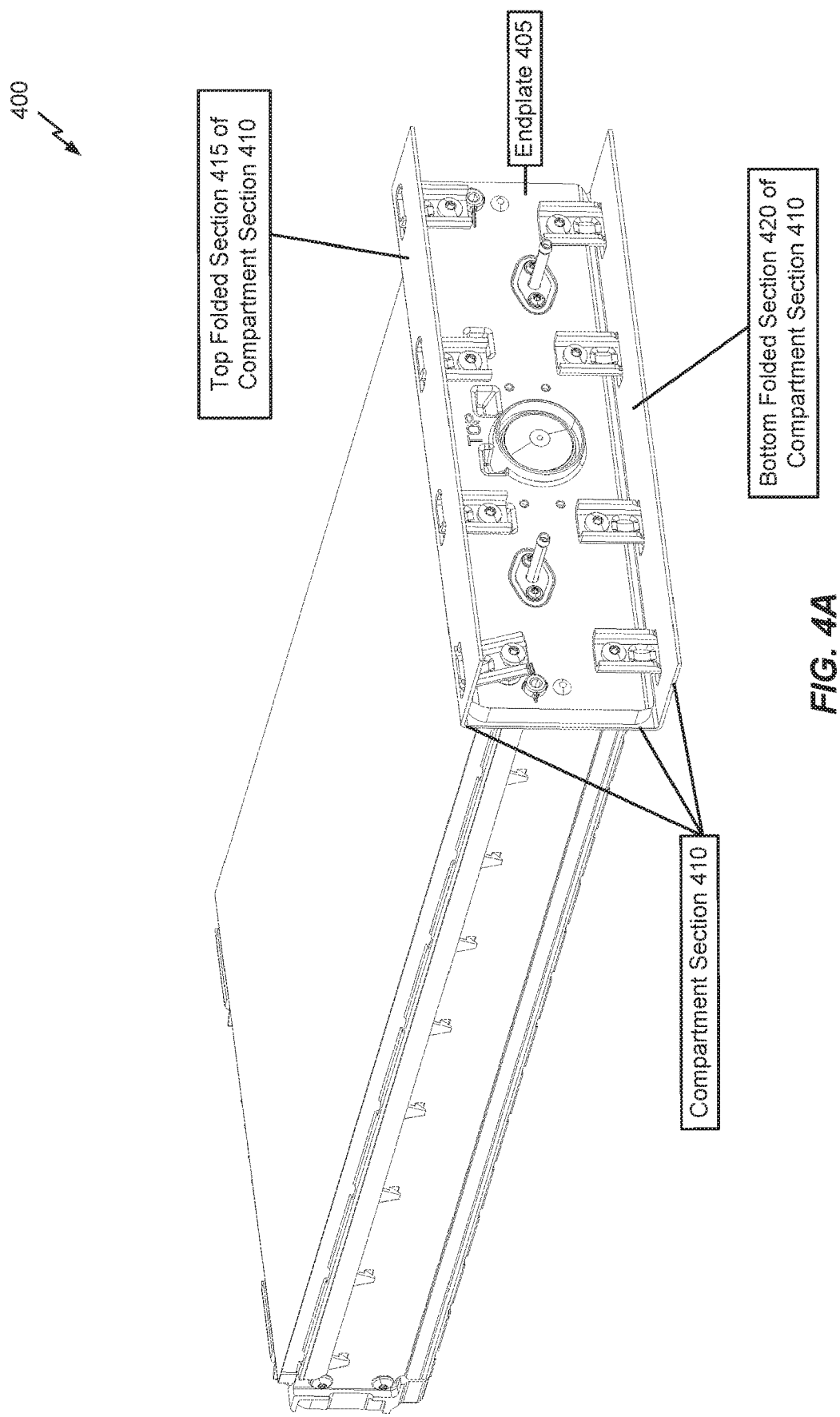
FIG. 4A illustrates an isometric front-perspective of a battery module including an integrated clamp-based insertion-side cover in accordance with an embodiment of the disclosure.

FIG. 4A illustrates an isometric front-perspective of a battery module 400 including an integrated clamp-based insertion-side cover in accordance with an embodiment of the disclosure. Referring to FIG. 4A, the clamp-based insertion-side cover reduces the size of the flange sections and omits the endplate-to-compartment fixation points 115 described above with respect to FIGS. 1-3, and instead includes a plurality of endplate-to-compartment clamping arrangements (described in more detail below). The clamp-based insertion-side cover includes an endplate 405 of the battery module 400, and a compartment section 410. The compartment section 410 is folded so as to include a top folded section 415 and a bottom folded section 420. The top and bottom folded sections 415 and 420 include holes or cutouts inside of which endplate-to-compartment clamping arrangements are arranged.

Figure 4B:
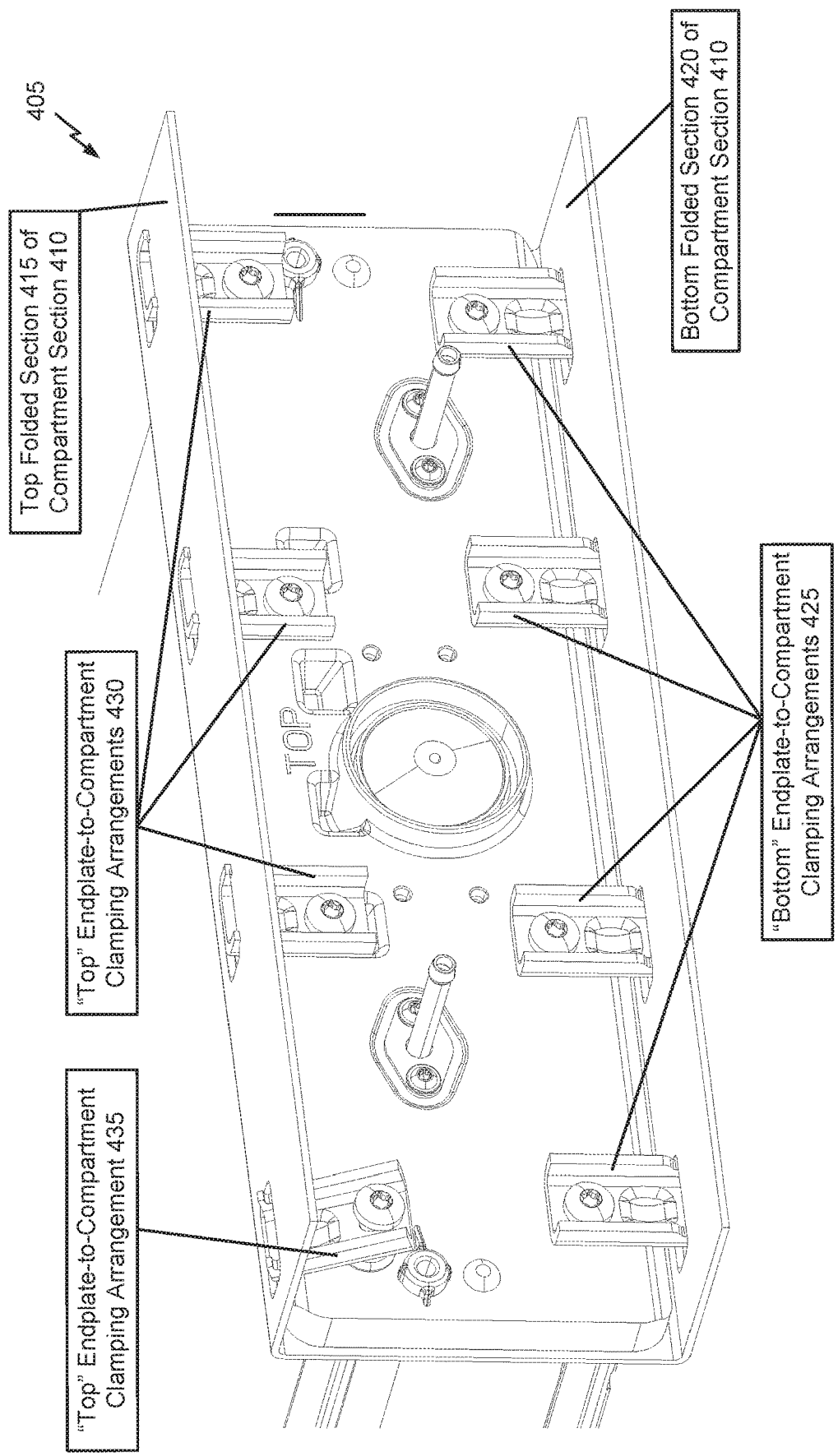
FIG. 4B illustrates the clamp-based insertion-side cover of FIG. 4A in more detail.

FIG. 4B illustrates the clamp-based insertion-side cover of FIG. 4A in more detail. Referring to FIG. 4B, "bottom" endplate-to-compartment clamping arrangements 425 are arranged inside holes of the bottom folded section 420, and "top" endplate-to-compartment clamping arrangements 430-435 are arranged inside holes of the top folded section 415. The "bottom" endplate-to-compartment clamping arrangements 425 and the "top" endplate-to-compartment clamping arrangements 430 are each shown in a tightened or locked state, while the "top" endplate-to-compartment clamping arrangement 435 is shown in an untightened or loosened state. As will be described in more detail below, tightening of the endplate-to-compartment clamping arrangements functions to secure the battery module 400 inside a respective battery module compartment, while untightening or loosening the endplate-to-compartment clamping arrangements permits removal of the battery module 400 from the respective battery module compartment.

Figure 4C:
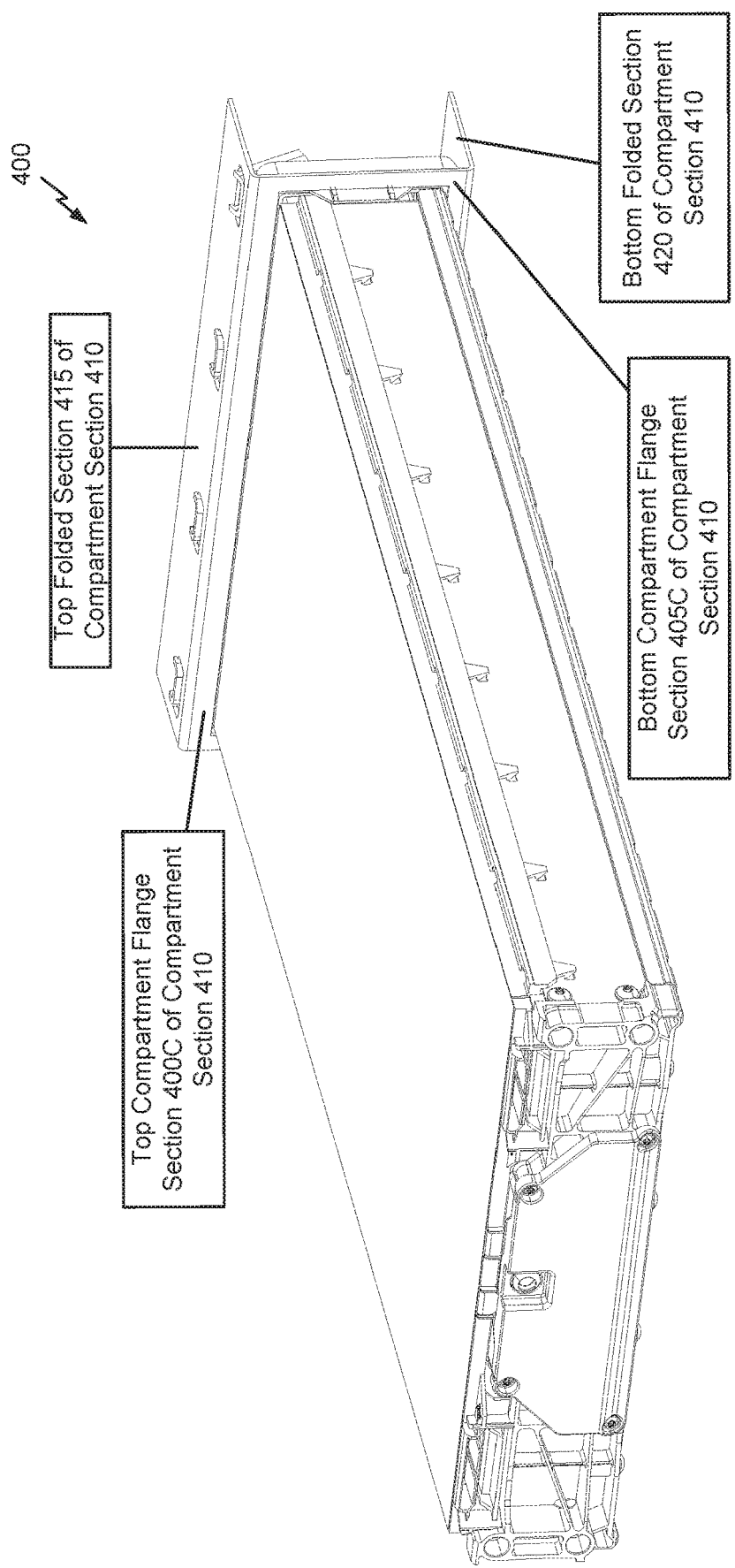
FIG. 4C illustrates an isometric rear-perspective of an exterior framing of a battery module of FIG. 4A in accordance with an embodiment of the disclosure.

FIG. 4C illustrates an isometric rear-perspective of an exterior framing of a battery module 400 in accordance with an embodiment of the disclosure. Various components of the battery module 400 are depicted in FIG. 4C (e.g., optical LC communications interface, rear endplate fixation recesses for fixation of the battery module 400 inside of a battery module compartment, guiding elements for facilitating on sidewalls of the battery module 400, etc.) but are not labeled or described in detail as such features do not relate specifically to the manner in which the insertion-side cover 405 is secured to the battery module compartment.

Referring to FIG. 4C, top and bottom compartment flange sections 400C and 405C of the compartment section 410 are shown. As will be described below in more detail, the top and bottom compartment flange sections 400C and 405C are contacted by endplate sections of the endplate 405 that receive contact pressure from bulged sections of U-shaped clamping bars of endplate-to-compartment clamping arrangements.

Referring to FIGS. 1-2, the flange sections for the fixation points 115 and 200 extend upwards and downwards from the battery module compartment so as to create a vertical footprint (e.g., 137.95 millimeters (mm)). By contrast, top and bottom compartment flange sections 400C and 405C of the compartment section 410 are each shorter than the flange sections for the fixation points 115 and 200 in FIGS. 1-2, which reduces the vertical footprint required by the battery module 400 (e.g., from 137.95 mm to 106.5 mm). In an example, the top and bottom compartment flange sections 400C and 405C may each have a vertical distance that is approximately 15.5 mm less than the vertical distance required for the flange sections for the fixation points 115 and 200 shown in FIGS. 1-2. This in turn reduces the overall vertical footprint required for the battery housing.

In a further embodiment, the battery housing (and hence, the clamp-based insertion-side cover) may form part of the chassis of an electric vehicle in at least one embodiment, so reducing the vertical footprint of the battery module compartment using the clamp-based insertion-side cover may in turn reduce a vertical footprint (e.g., a height in the Z direction) of the electric vehicle chassis as well.

Figure 5A:
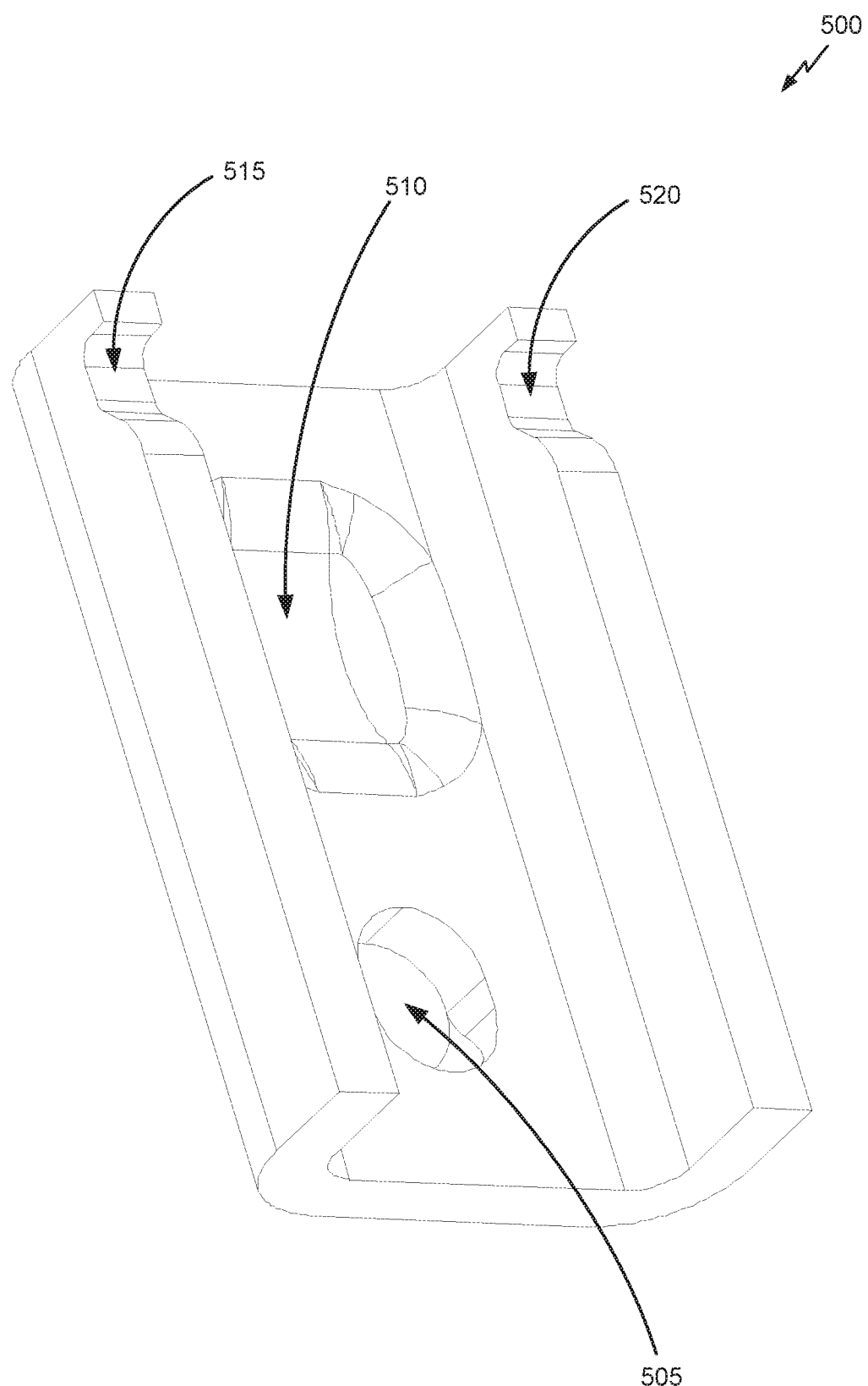
FIG. 5A illustrates an isometric front-perspective of a U-shaped clamping bar in accordance with an embodiment of the disclosure.

FIG. 5A illustrates an isometric front-perspective of a U-shaped clamping bar 500 in accordance with an embodiment of the disclosure. In particular, the U-shaped clamping bar 500 is folded so as to have to a U-shape, as shown in FIG. 5A. In an example, the U-shaped clamping bar 500 may be made from a metallic material (e.g., steel), and may undergo deformation or plasticization to increase elasticity and to help to ensure that a homogeneous clamping force (or clamping pressure) is applied by equalizing the associated tolerances. The U-shaped clamping bar 500 is a component of the endplate-to-compartment clamping arrangements 425-435 described above with respect to FIG. 4B. The U-shaped clamping bar 500 includes a hole (e.g., a screw hole or bolt hole) 505, a bulged section 510, and grooves 515 and 520. The grooves 515 and 520 are arranged at opposite ends of the U-shape of the U-shaped clamping bar 500, as shown in FIG. 5A (e.g., at the same vertical level, such that both grooves 515-520 are aligned with the top folded section when a screw inside of the hole 505 is tightened).

In an example, the "U-shape" of the U-shaped clamping bar 500 may help to protect against the U-shaped clamping bar 500 from falling off the battery module 400 altogether, while still permitting flexibility of movement while in a loosened state. However, it will be appreciated that other shapes could also accomplish this objective (e.g., a semi-circle, a set of 3 joined bars that meet at right angles for a more rectangular shape, etc.). Accordingly, the "U-shape" of the U-shaped clamping bar 500 is merely representative of one particular embodiment, and is not intended to limit clamping bars in all embodiments to a "U-shape" implementation.

Figure 5B:
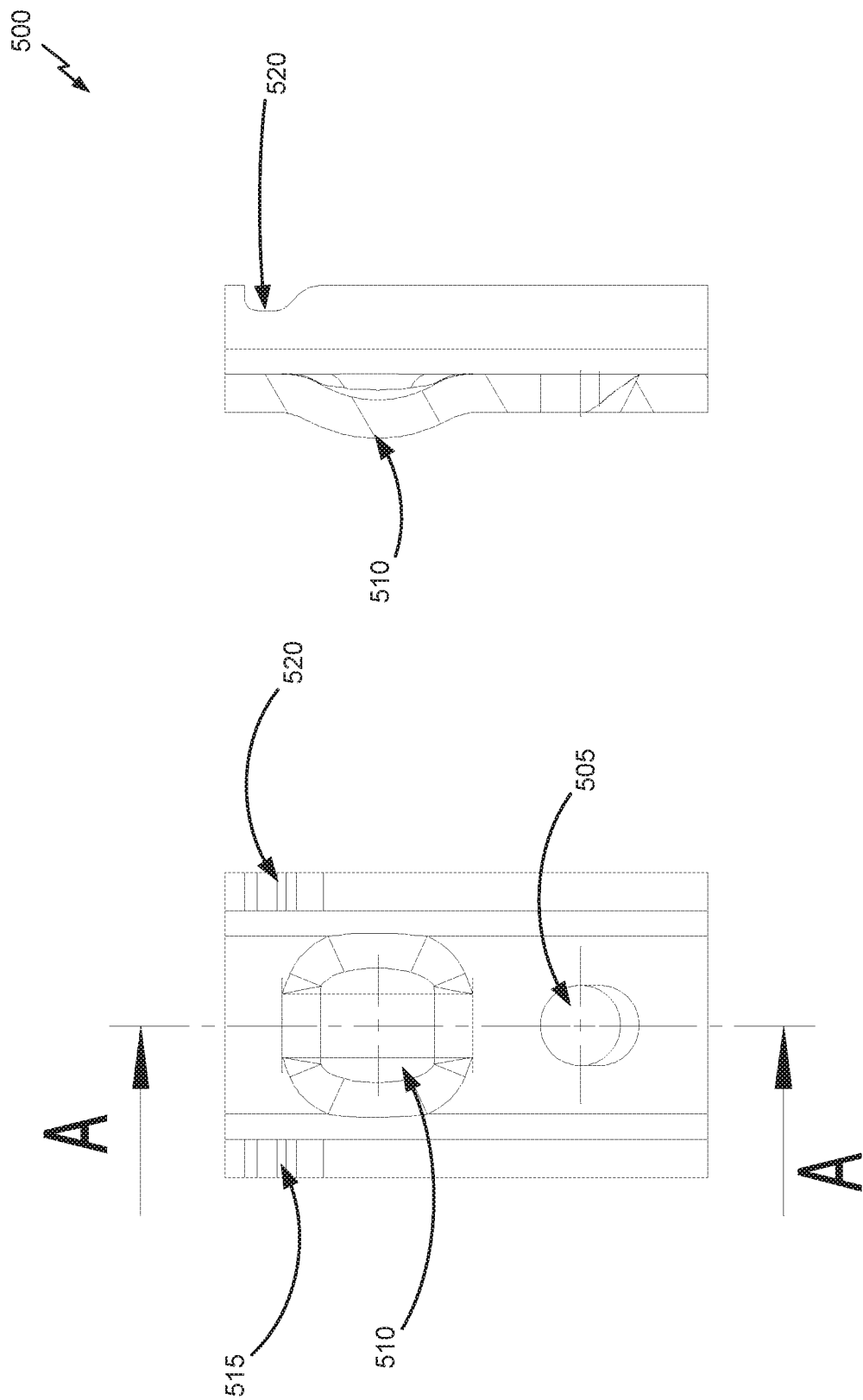
FIG. 5B illustrates a front-perspective and a side-perspective cross-section of the U-shaped clamping bar of FIG. 5A in accordance with an embodiment of the disclosure.

FIG. 5B illustrates a front-perspective and a side-perspective cross-section (taken along the A-A line noted in the front-perspective) of the U-shaped clamping bar 500 in accordance with an embodiment of the disclosure.

Figure 5C:
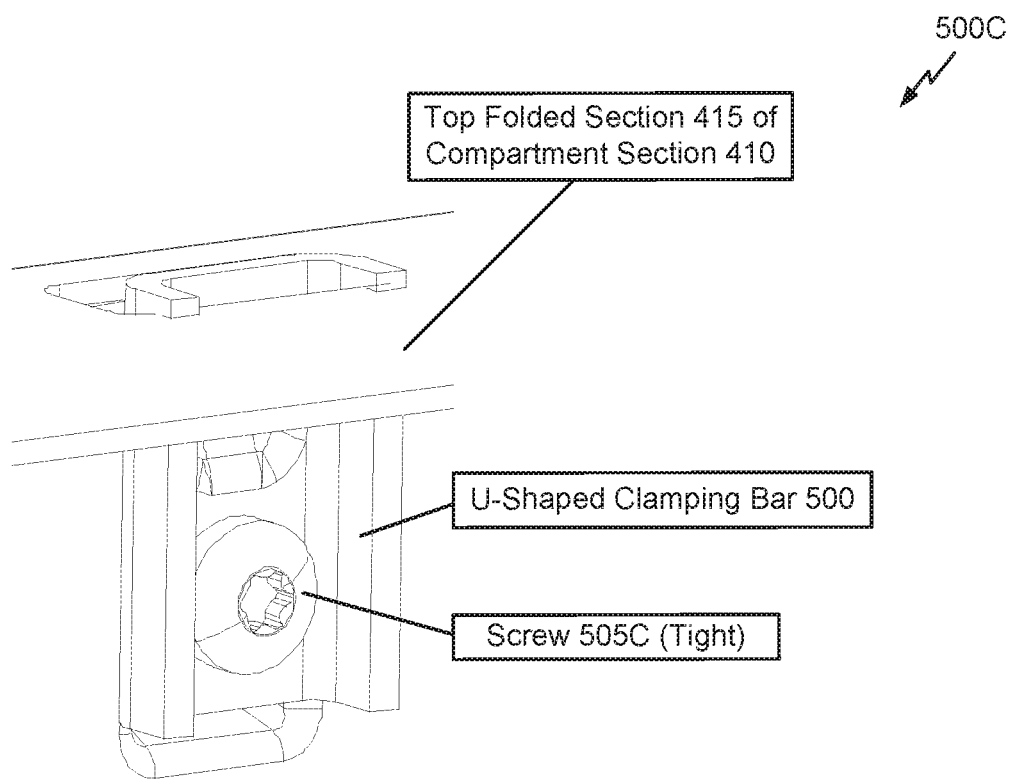
FIG. 5C illustrates an endplate-to-compartment clamping arrangement in accordance with an embodiment of the disclosure.

FIG. 5C illustrates an endplate-to-compartment clamping arrangement 500C in accordance with an embodiment of the disclosure. In particular, the endplate-to-compartment clamping arrangement 500C corresponds to one of the "top" endplate-to-compartment clamping arrangement 430 from FIG. 4B. In FIG. 5C, a screw 505C is tightened inside a fixation point in the endplate 405 that is aligned with the hole 505 of the U-shaped clamping bar 500. As the screw 505C is tightened, the bulged section 510 acts as a fulcrum over which the U-shaped clamping bar 500 "rolls" or pivots, which causes the grooves 515 and 520 to move away from the endplate 405 until the grooves 515 and 520 catch, and lock into, the top folded section 415. As will be appreciated, the grooves 515 and 520 are aligned with the top folded section 415 to facilitate the above-noted locking function. When locked in this manner, the top folded section 415 braces the U-shaped clamping bar 500 against further backward movement by supporting the reaction force in response to the clamping.

As the screw 505C continues to tighten, the bulged section 510 is pushed against the endplate 405 (e.g., while the grooves 515 and 520 are locked onto and braced by the top folded section 415), creating contact pressure that is applied to the top compartment flange section 400C shown in FIG. 4C (e.g., via an intervening endplate section in the insertion-side cover 405). This contact pressure functions to secure the endplate 405 (and hence, the entire battery module 400) to the compartment section 410 of the battery module compartment. In an example, the U-shaped clamping bar 500 may be configured to become deformed as contact pressure is increased (e.g., as the screw 505C is tightened). Moreover, as will be described in more detail below, the contact pressure between the endplate 405 and the compartment section 410 is configured to form a sealed connection.

Figure 5D:
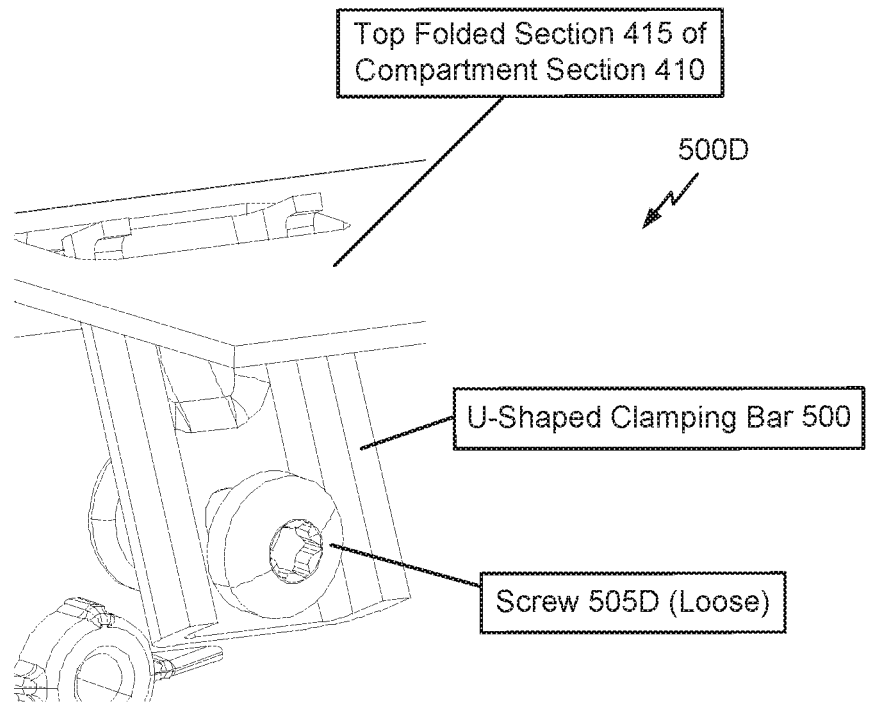
FIG. 5D illustrates an endplate-to-compartment clamping arrangement in accordance with another embodiment of the disclosure.

FIG. 5D illustrates an endplate-to-compartment clamping arrangement 500D in accordance with an embodiment of the disclosure. In particular, the endplate-to-compartment clamping arrangement 500D corresponds to the "top" endplate-to-compartment clamping arrangement 435 from FIG. 4B. In FIG. 5D, a screw 505D is loosened inside of a fixation point of the endplate 405 that is aligned with the hole 505 of the U-shaped clamping bar 500. As the screw 505D is loosened, the contact pressure from the bulged section 510 to the top compartment flange section 400C is reduced, such that the battery module 400 is no longer secured inside the battery module compartment and can be removed. In particular, the U-shaped clamping bar 500 is unlocked from the top folded section 415, after which the battery module 400 can be removed from the battery module compartment.

Referring to FIG. 5D, the screw 505D may be configured to remain in the U-shaped clamping bar 500 even in a loosened state. In this case, while being loosened, the screw 505D will reach a point at which the screw 505D cannot be further loosened, such that the screw 505D cannot be removed from the U-shaped clamping bar 500. Alternatively, the screw 505D may be configured to be removable from the U-shaped clamping bar 500 if the loosening of the screw 505D exceeds a threshold.

Figure 6A:
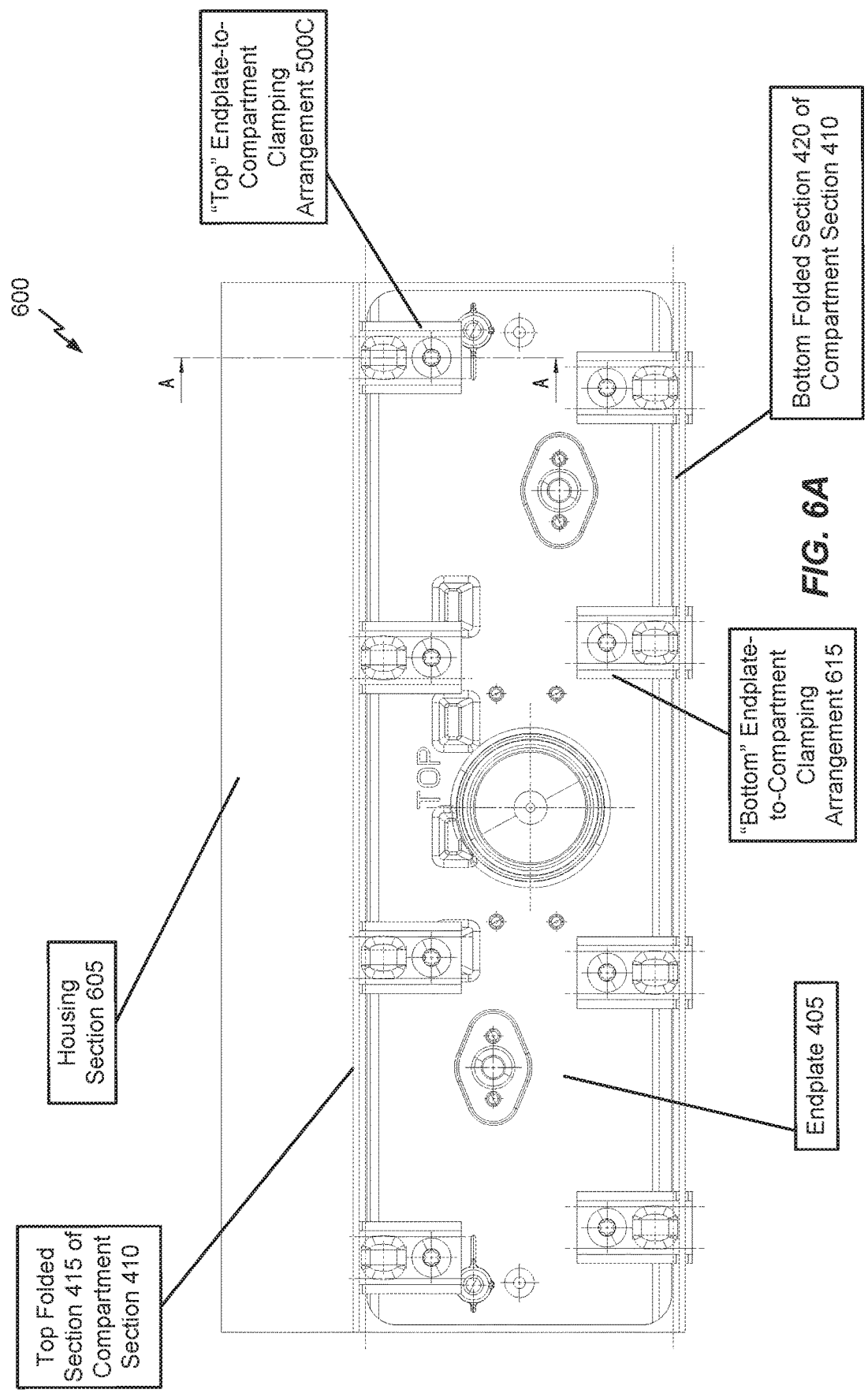
FIG. 6A illustrates a front-perspective of a battery module arrangement after insertion of a battery module into a battery module compartment in accordance with an embodiment of the disclosure.

FIG. 6A illustrates a front-perspective of a battery module arrangement 600 after insertion of the battery module 400 into a battery module compartment in accordance with an embodiment of the disclosure.

Referring to FIG. 6A, a housing section 605 is arranged over the battery module 400. In an example, the top folded section 415 of the compartment section 410 contacts an underside of the housing section 605. A plurality of "top" endplate-to-compartment clamping arrangements 500C are shown, as well as a plurality of "bottom" endplate-to-compartment clamping arrangements 610. The "bottom" endplate-to-compartment clamping arrangements 610 are essentially inverted (e.g., upside-down) versions of the "top" endplate-to-compartment clamping arrangements 500C. In an example, while not shown expressly in FIG. 6A, the bottom folded section 420 of the compartment section 410 may contact a top-side of another housing section (not shown) arranged beneath the battery module 400.

Figure 6B:
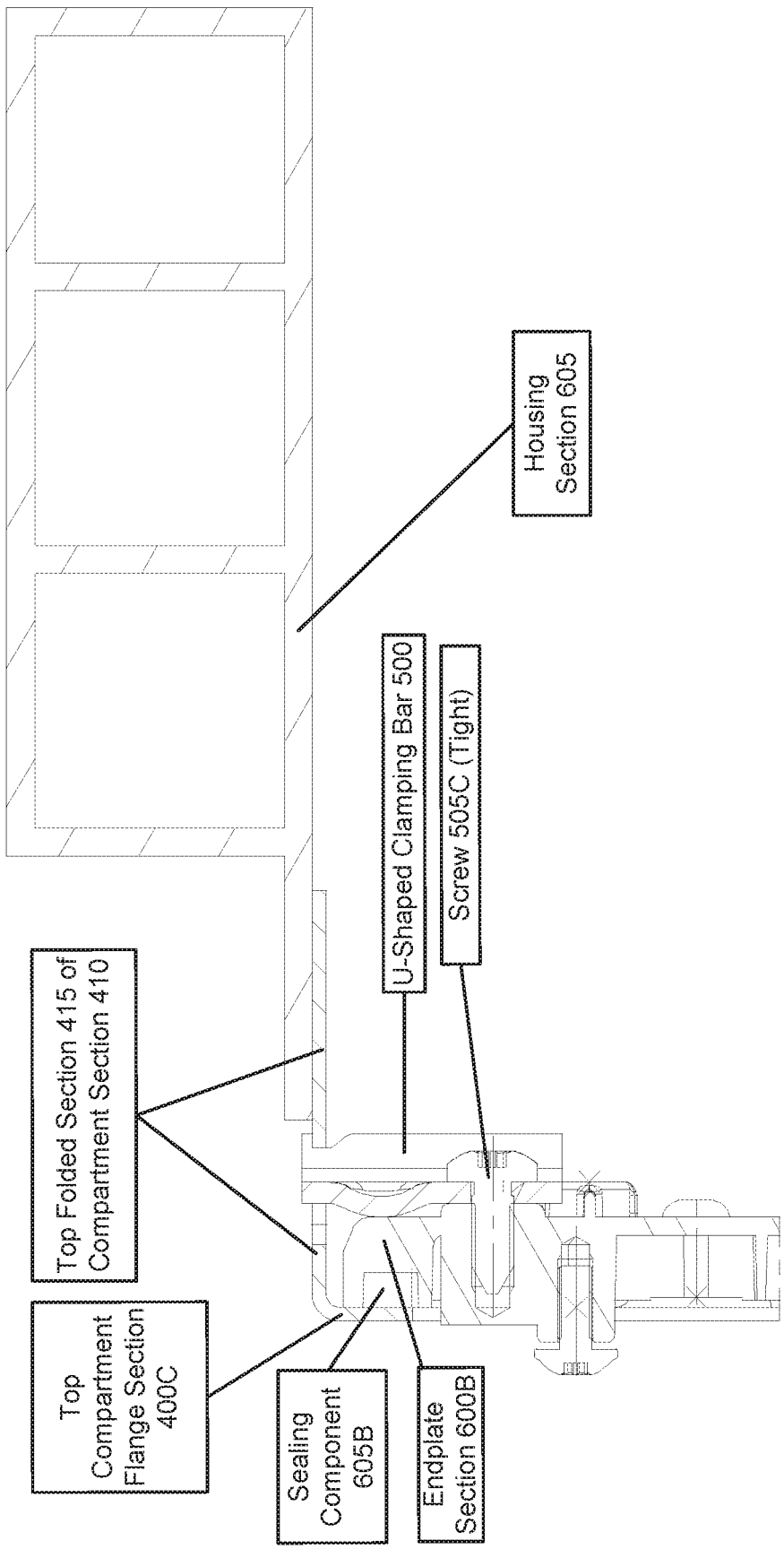
FIG. 6B illustrates a side-perspective cross-section of the battery module arrangement of FIG. 6A in accordance with an embodiment of the disclosure.

FIG. 6B illustrates a side-perspective cross-section (taken along the A-A line noted in the front-perspective of FIG. 6A) of the battery module arrangement 600 of FIG. 6A in accordance with an embodiment of the disclosure. In FIG. 6B, a "top" endplate-to-compartment clamping arrangement 500C is shown in a tightened state, whereby endplate section 600B receives contact pressure from the bulged section 610 of the U-shaped clamping bar 500. This contact pressure is transferred to the top compartment flange section 400C, which functions to secure the endplate 405 to the compartment section 410. Moreover, a sealing component 605B (e.g., a rubber gasket, etc.) is arranged inside of the endplate section 600B. So, the contact pressure pressing upon the sealing component 605B between the endplate section 600B and the top compartment flange section 400C functions to seal the battery module compartment.

Figure 6C:
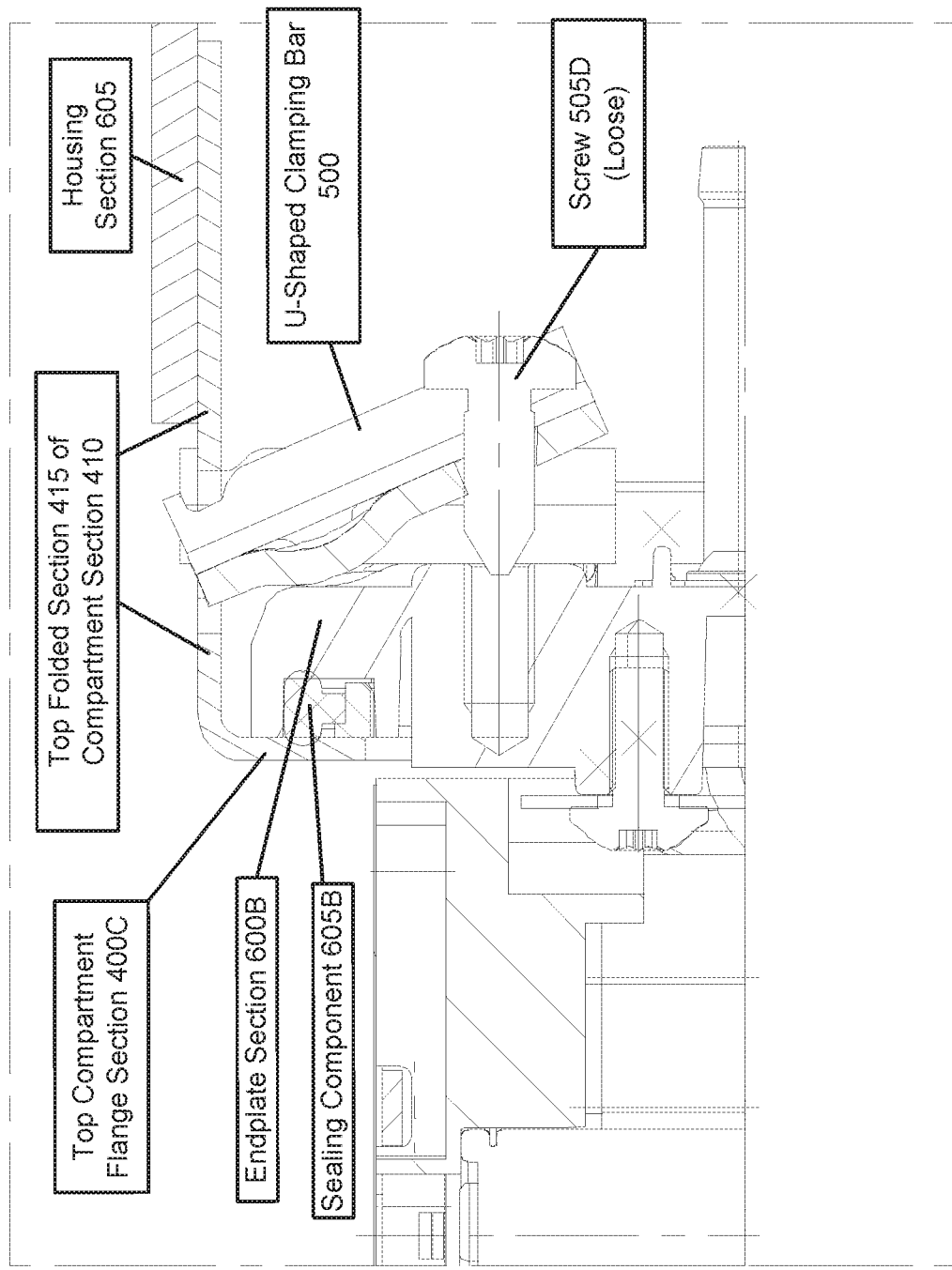
FIG. 6C illustrates a side-perspective cross-section of the battery module arrangement of FIG. 6A in accordance with another embodiment of the disclosure.

FIG. 6C illustrates a side-perspective cross-section of the battery module arrangement 600 of FIG. 6A in accordance with another embodiment of the disclosure. In FIG. 6C, the "top" endplate-to-compartment clamping arrangement 500C is shown in a loosened state, whereby endplate section 600B does not receive contact pressure from the bulged section 610 of the U-shaped clamping bar 500.

Figure 6D:
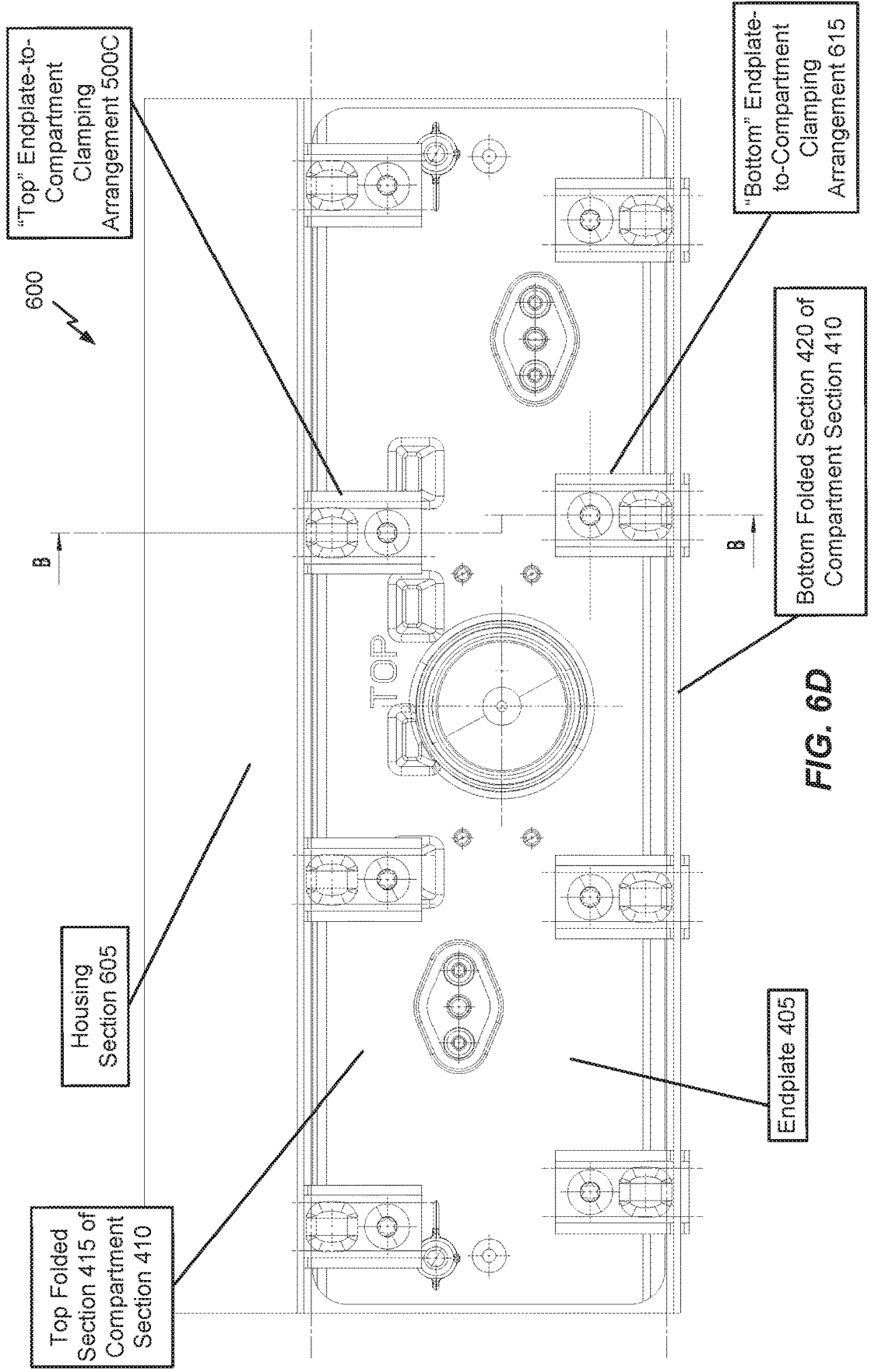
FIG. 6D illustrates a front-perspective of a battery module arrangement of FIG. 6A in accordance with another embodiment of the disclosure.

FIG. 6D illustrates a front-perspective of the battery module arrangement 600 of FIG. 6A in accordance with another embodiment of the disclosure. FIG. 6D is identical to FIG. 6C, except that a B-B line is marked across both "top" and "bottom" endplate-to-compartment clamping arrangements.

Figure 6E:
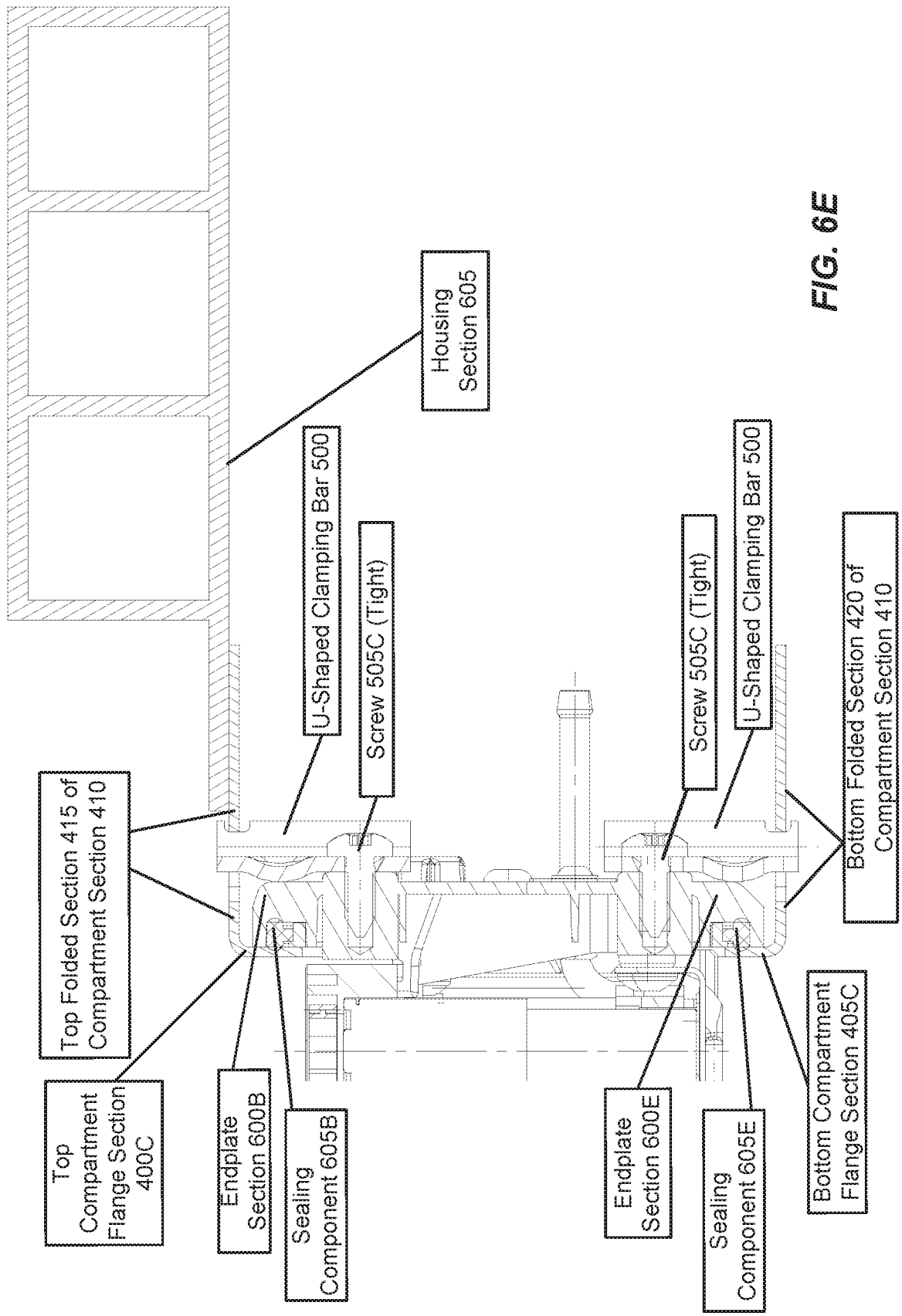
FIG. 6E illustrates a side-perspective cross-section of the battery module arrangement of FIG. 6D in accordance with an embodiment of the disclosure.

FIG. 6E illustrates a side-perspective cross-section (taken along the B-B line noted in the front-perspective of FIG. 6D) of the battery module arrangement 600 of FIG. 6D in accordance with an embodiment of the disclosure. In FIG. 6D, "top" and "bottom" endplate-to-compartment clamping arrangements 500C and 615 are shown in a tightened state, whereby endplate sections 600B and 600E each receive contact pressure from the bulged sections 610 of the U-shaped clamping bars 500 of the "top" and "bottom" endplate-to-compartment clamping arrangements 500C and 615, respectively. This contact pressure presses upon the sealing components 605B and 605E, respectively. In an example, the sealing components 605B and 605E may be part of one continuous seal (e.g., a rubber gasket, etc.) that runs around the endplate 405. While not shown expressly in FIG. 6E, the bottom folded section 420 of the compartment section 405 may contact a top-side of another housing section (not shown) arranged beneath the battery module 400.

In a further embodiment, the bulged section 510 of the U-shaped clamping bar 500 may be aligned with a concave section of a respective endplate section, resulting in lower contact pressure in the contact zone. In an alternative embodiment, the bulged section 510 of the U-shaped clamping bar 500 may be aligned with a flat section of a respective endplate section, resulting in higher contact pressure in the contact zone. In an alternative embodiment, the bulged section 510 of the U-shaped clamping bar 500 may be aligned with a convex section of a respective endplate section, resulting in lower contact pressure in the contact zone. Accordingly, a shape of a portion of the endplate section that contacts the bulged section 510 of the U-shaped clamping bar 500 can be controlled so as to regulate an amount of contact pressure applied thereto.

While some embodiments have been described above with respect to "top" endplate-to-compartment clamping arrangements, these descriptions also apply to "bottom" endplate-to-compartment clamping arrangements. In particular, in various embodiments, the "top" and "bottom" endplate-to-compartment clamping arrangements are arranged as mirror images of each other.

Further, while the grooves 515-520 of the U-shaped clamping bar 500 are arranged inside holes or cutouts of the top and bottom folded sections 415 and 420 in the above-described embodiments, in alternative embodiments the grooves 515-520 could instead be configured to lock onto a separate groove-locking component. For example, groove-locking components such as a metal bands may be arranged on the top and bottom folded sections 415 and 420, with the grooves 515-520 being configured to lock onto respective edges of these groove-locking components instead of being locked directly onto the top and bottom folded sections 415 and 420 inside respective holes or cutouts as described above. In this case, the holes or cutouts need not be made part of the top and bottom folded sections 415 and 420 at all.

Figure 7A:
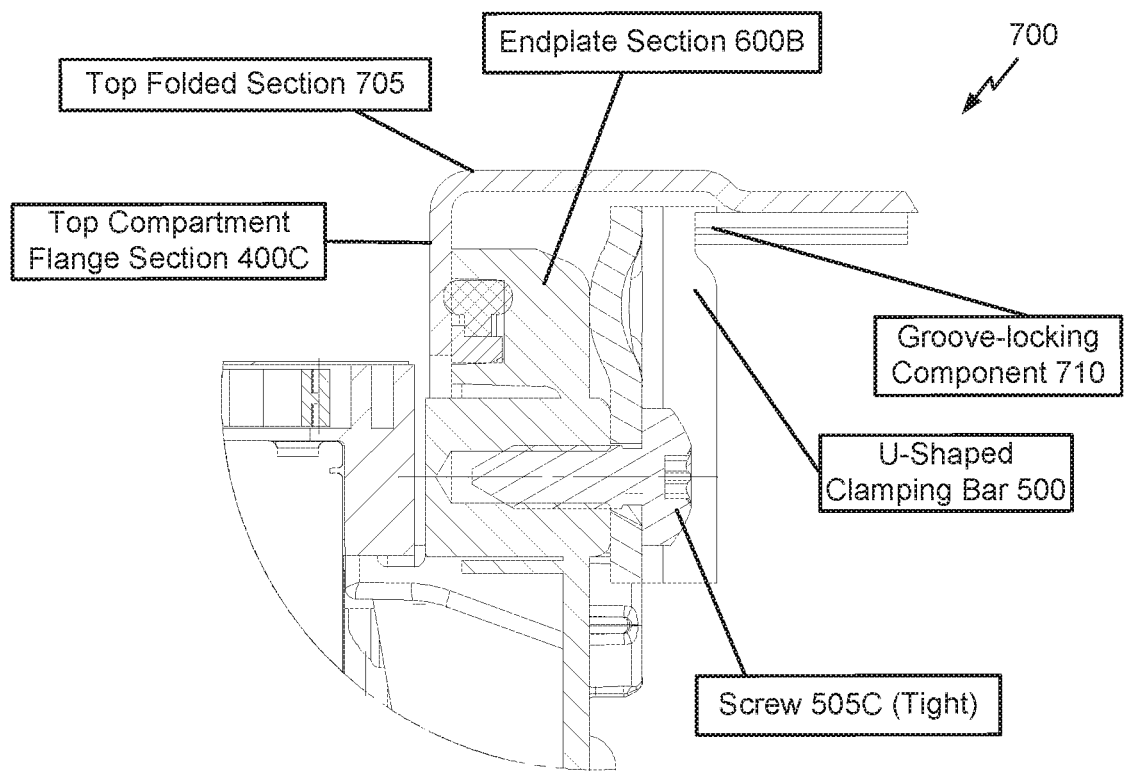
FIG. 7A illustrates a side-perspective of an endplate-to-compartment clamping arrangement in accordance with another embodiment of the disclosure.
Figure 7B:
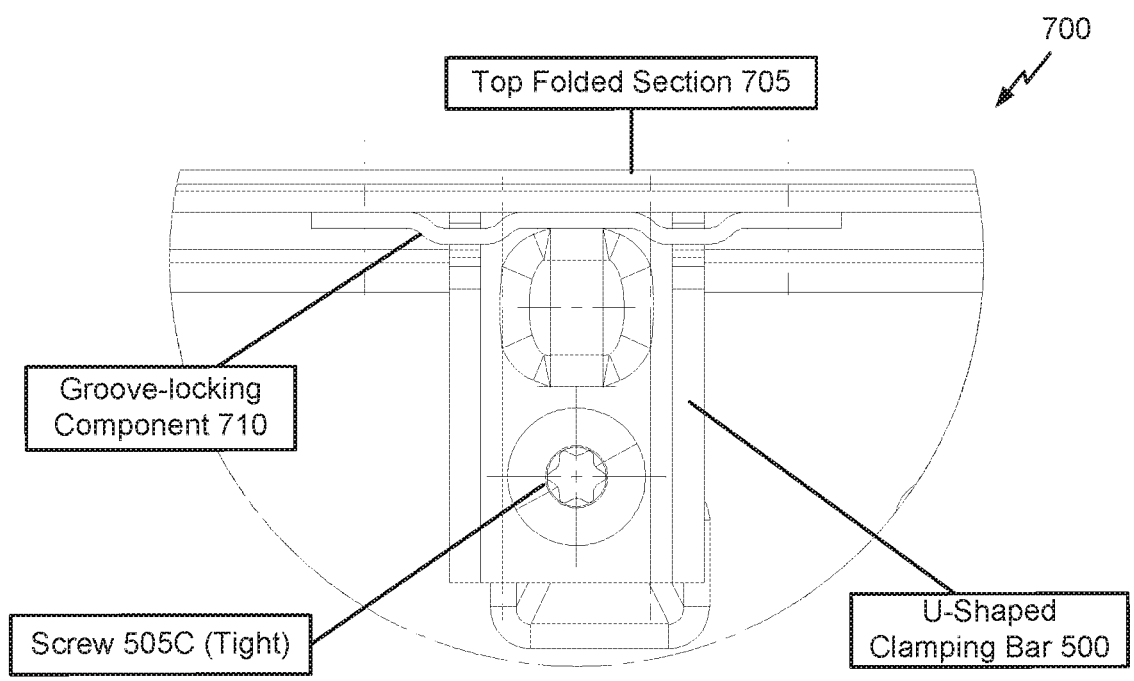
FIG. 7B illustrates a front-perspective of the endplate-to-compartment clamping arrangement of FIG. 7A in accordance with an embodiment of the disclosure.

FIG. 7A illustrates a side-perspective of an endplate-to-compartment clamping arrangement 700 in accordance with another embodiment of the disclosure. FIG. 7B illustrates a front-perspective of the endplate-to-compartment clamping arrangement 700 in accordance with an embodiment of the disclosure.

Referring to FIGS. 7A-7B, the compartment section 410 is configured with a top folded section 705 that does not include the holes or cutouts shown in the top folded section 415 of FIGS. 4A-4C. Instead, a groove-locking component 710 mounted onto the top folded section 705, and the grooves 515-520 of the U-shaped clamping bar 500 lock onto the groove-locking component 710. In an example, the groove-locking component 710 may be configured as a metal band that is spot welded onto the top folded section 705. While FIGS. 7A-7B are described with respect to the top folded section 705, it will be appreciated that the bottom folded section may be configured similarly (e.g., with groove-locking components mounted onto the top folded section instead of holes or cutouts arranged to catch the grooves 515-520 of the U-shaped clamping bars).

Figure 8A:
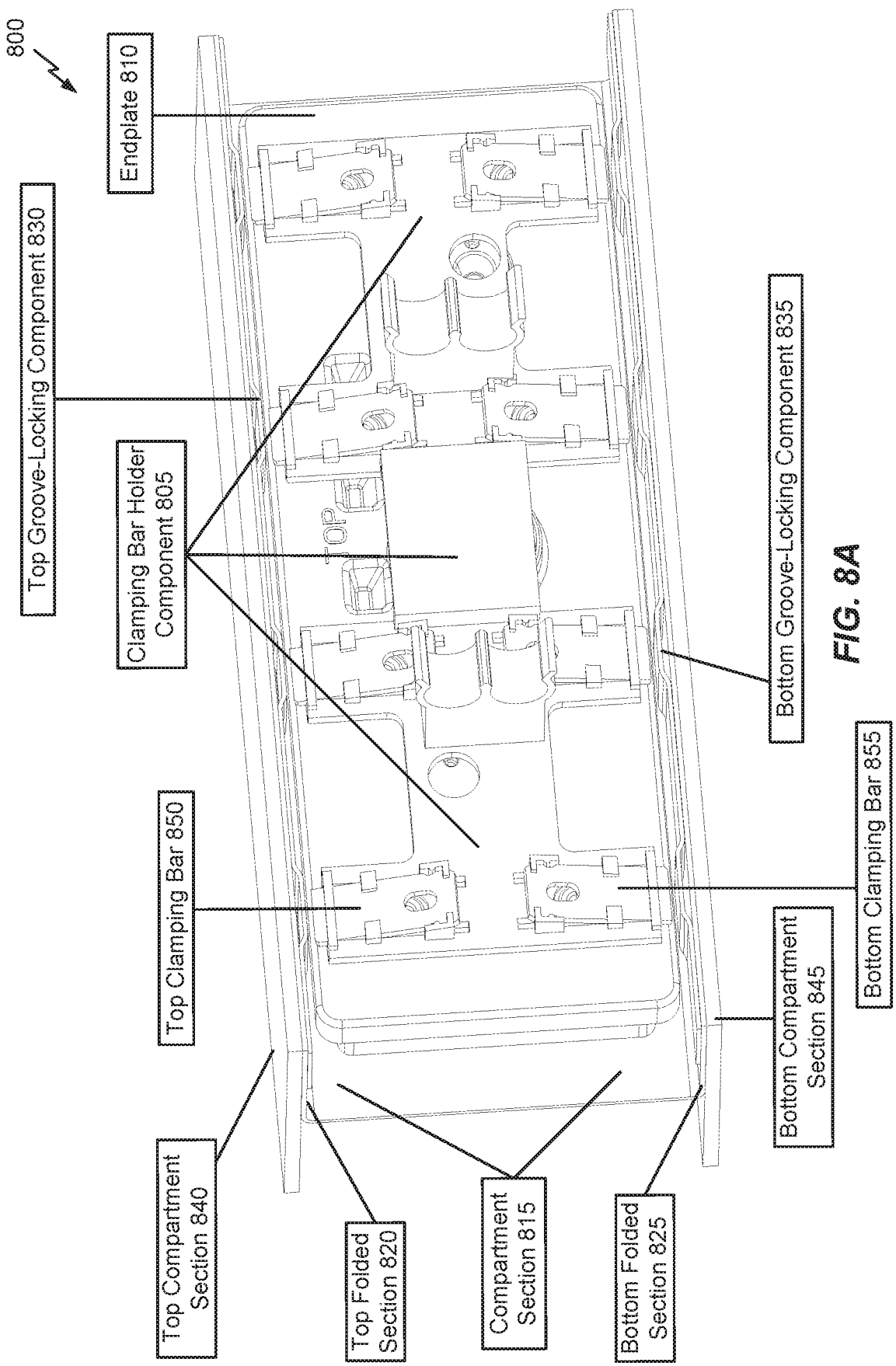
FIG. 8A illustrates an isometric perspective of a clamp-based insertion-side cover in accordance with another embodiment of the disclosure.

FIG. 8A illustrates an isometric perspective of a clamp-based insertion-side cover 800 in accordance with another embodiment of the disclosure. Referring to FIG. 8A, a clamping bar holder component 805 is depicted, which is configured to be attached to an endplate 810. For example, the clamping bar holder component 805 may be attached to the endplate 810 via an attachment mechanism, such as screws (not shown in FIG. 8A) through respective screw openings in the clamping bars and clamping bar holders, whereby the screws may be only partially screwed into respective screw holes in the endplate 810 to permit the clamping bars to be maintained in a parked state during insertion/removal of the battery module). In other embodiments, other attachment mechanisms may be used (e.g., rivets, pieces of welded metal, etc.), as will be described below in more detail. In FIG. 8A, the clamping bar holder component 805 is not yet attached to the endplate 810, as the attachment mechanism has not yet been applied.

Referring to FIG. 8A, in an example, the clamping bar holder component 805 may be a single integrated component having different sections that provide different functionalities (e.g., clamping bar holders, cooling manifold clips, cooling connection holes, etc.), as discussed in more detail below. In an example, the clamping bar holder component 805 may be made from a material such as plastic.

Also shown in FIG. 8A is a compartment section 815 of a battery module compartment, which includes a top folded section 820 and a bottom folded section 825. The compartment section 815 extends past the top and bottom of the endplate 810 to form a flange for the endplate 810. While FIG. 8A is an example of a sheet metal-based battery module compartment, other embodiments may be directed to battery module compartments that are built with an extruded profile. A top groove-locking component 830 is attached (e.g., via gluing, welding, screwing or bolting, etc.) to an underside of the top folded section 820, and a bottom groove-locking component 835 is attached (e.g., via gluing, welding, screwing or bolting, etc.) to a topside of the bottom folded section 825. In an alternative embodiment, holes in the top and/or bottom folded sections 820-825 may be used for locking onto the top and bottom clamping bars instead of the groove locking components 830-835 depicted in FIG. 8A. Also, a top compartment section 840 (e.g., a top exterior framing part of the battery module compartment) is arranged on top of the top folded section 820 (e.g., secured via welding, etc.), and a bottom compartment section 845 (e.g., a bottom exterior framing part of the battery module compartment) is arranged below the bottom folded section 825 (e.g., secured via welding, etc.). In FIG. 8A, the clamping bar holder component 805 holds a plurality of top clamping bars, such as top clamping bar 850, and a plurality of bottom clamping bars, such as bottom clamping bar 855.

Figure 8B:
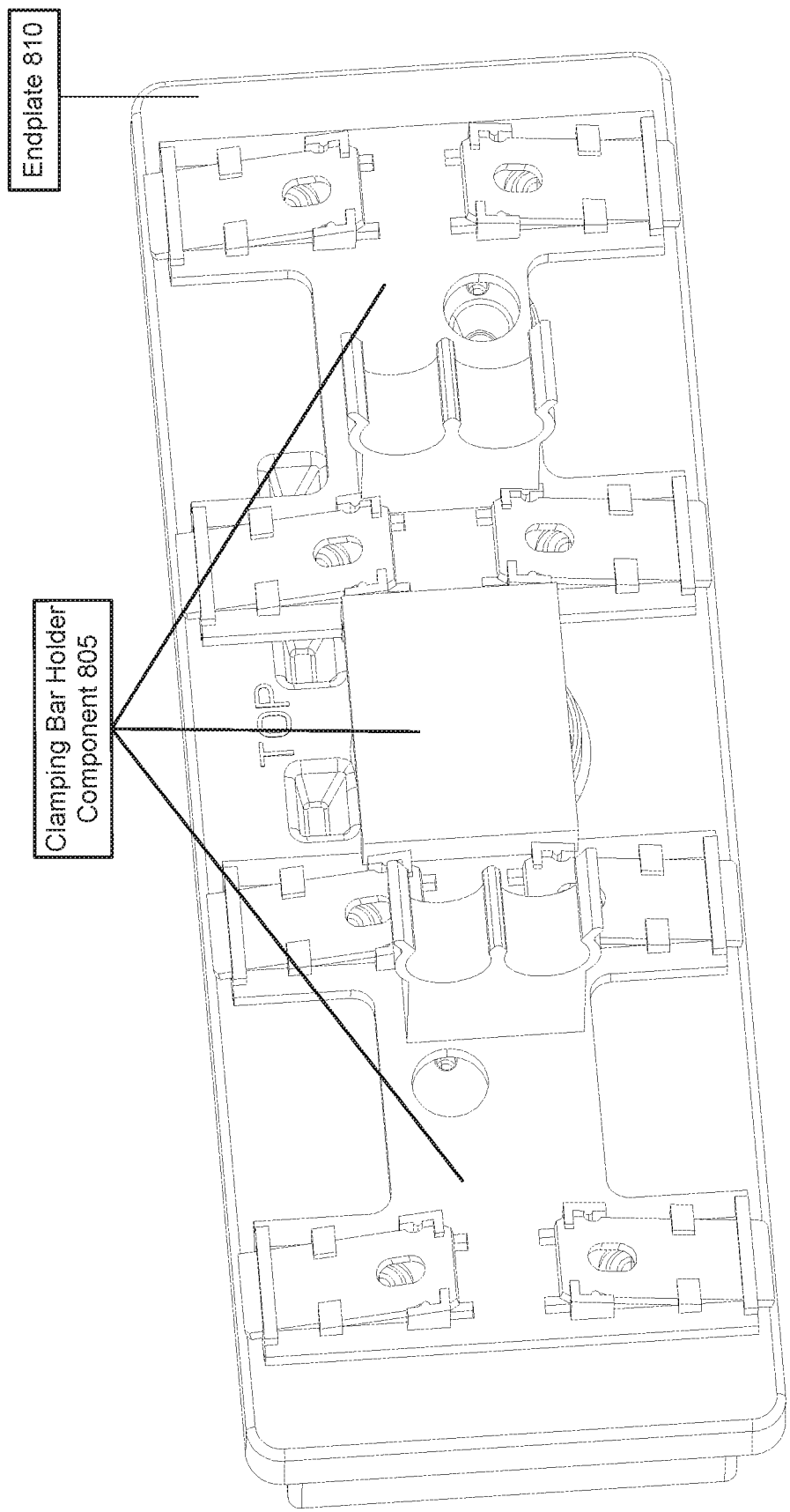
FIG. 8B illustrates the clamp-based insertion-side cover of FIG. 8A with all compartment sections being removed from view.

FIG. 8B illustrates the clamp-based insertion-side cover 800 of FIG. 8A with all compartment sections being removed from view. Accordingly, FIG. 8B illustrates the clamping bar holder component 805 and the endplate 810, along with the plurality of top clamping bars (e.g., top clamping bar 850) and the plurality of bottom clamping bars (e.g., bottom clamping bar 855). In FIGS. 8A-8B, the plurality of top and bottom clamping bars are each depicted in a "parked" state, whereby the plurality of top and bottom clamping bars are retracted (e.g., stopped from extending out from the clamping bar holder component 805 past a clearance threshold) so as to permit the battery module to be inserted into a battery module compartment and/or to be removed from the battery module compartment. The characteristics of the parked state will be described in more detail below.

Figure 8C:
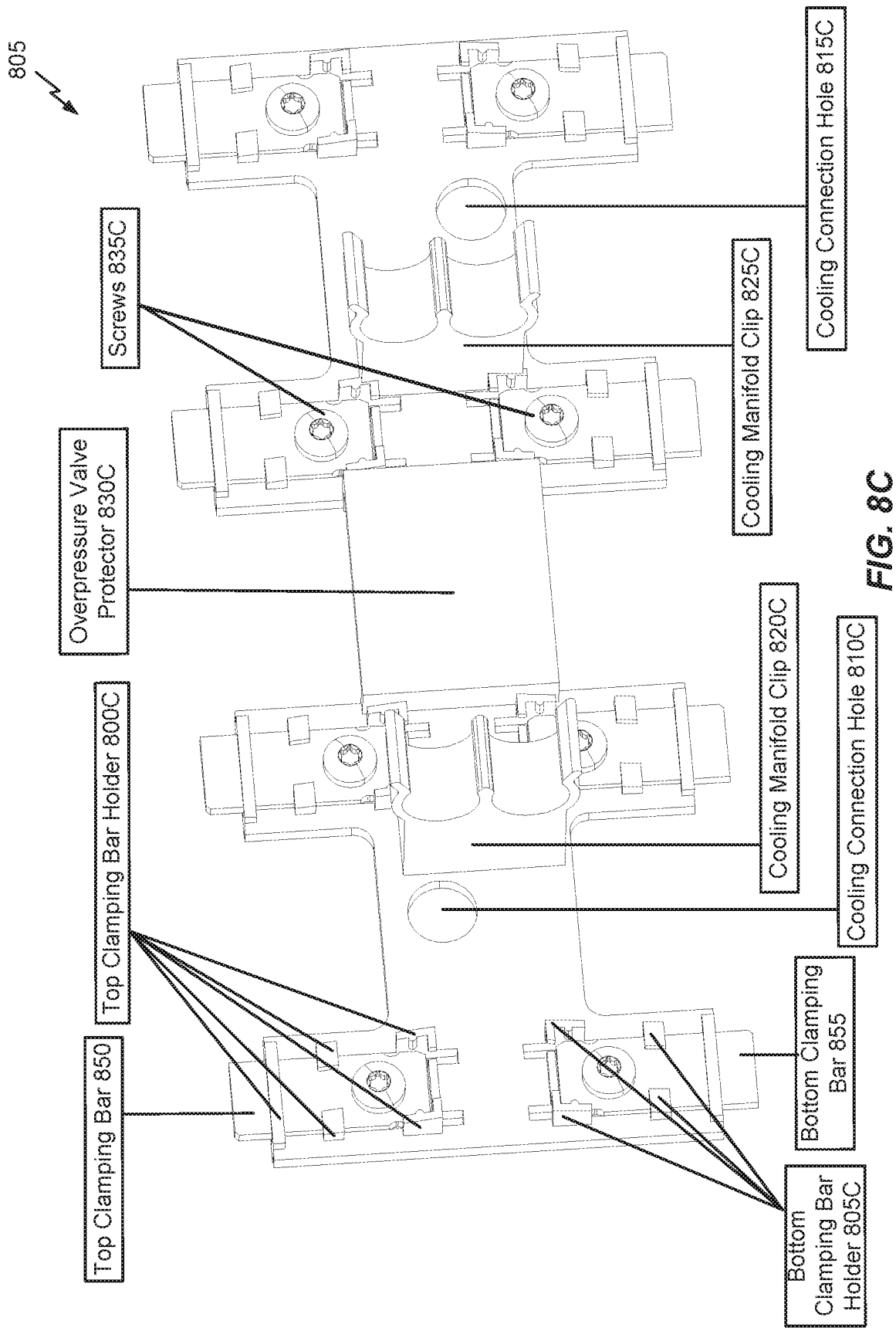
FIG. 8C illustrates a clamping bar holder component holding a plurality of top and bottom clamping bars in accordance with an embodiment of the disclosure.

FIG. 8C illustrates the clamping bar holder component 805 holding a plurality of top and bottom clamping bars in accordance with an embodiment of the disclosure. In FIG. 8C, the plurality of top and bottom clamping bars are each depicted in an "unparked" state, whereby the plurality of top and bottom clamping bars may be used to clamp the endplate to the battery module compartment via groove-locking components (not shown in FIG. 8C). The characteristics of the unparked state will be described in more detail below.

Referring to FIG. 8C, the clamping bar holder component 805 includes a plurality of top clamping bar holders, such as top clamping bar holder 800C, and a plurality of bottom clamping bar holders, such as bottom clamping bar 805C. In an example, screws such as screws 835C are inserted through screw openings in each top and bottom clamping bar and through screw openings in each of the top and bottom clamping bar holders. In one example, these screws are partially screwed into screw holes in the endplate 810 (not shown in FIG. 8C) to attach the clamping bar holder component 805 to the endplate 810 while the clamping bar holders are in the parked state.

The clamping bar holder component 805 further includes holes 810C-815C to permit access to at least one functional component integrated into the endplate 810. For example, the holes 810C-815C may be arranged over cooling connections (e.g., cooling connections 120 of FIG. 1). The clamping bar holder component 805 further includes cooling manifold clips 820C and 825C, which are configured to keep cooling manifold sections (not shown) of a cooling system for cooling the battery module in place. The clamping bar holder component 805 further includes at least one protector that is arranged over at least one functional component integrated into the endplate of the battery module, the protector being configured to protect the at least one functional component from external contaminants and/or to block unauthorized personnel from accessing the at least one functional component. For example, the at least one protector may include an overpressure valve protector 830C. For example, an overpressure valve (e.g., similar to the overpressure valve 125 of FIG. 1) may be arranged in the endplate 810 behind the overpressure valve protector 830C.

The overpressure valve protector 830C blocks contaminants from accumulating near the overpressure valve, which reduces the likelihood that the overpressure valve will 'stick' (e.g., fail to open) when an overpressure condition of the battery module occurs. Further, the overpressure valve protector 830C makes it more difficult for unauthorized personnel to access the overpressure valve, which would otherwise pose a safety risk.

Figure 8D:
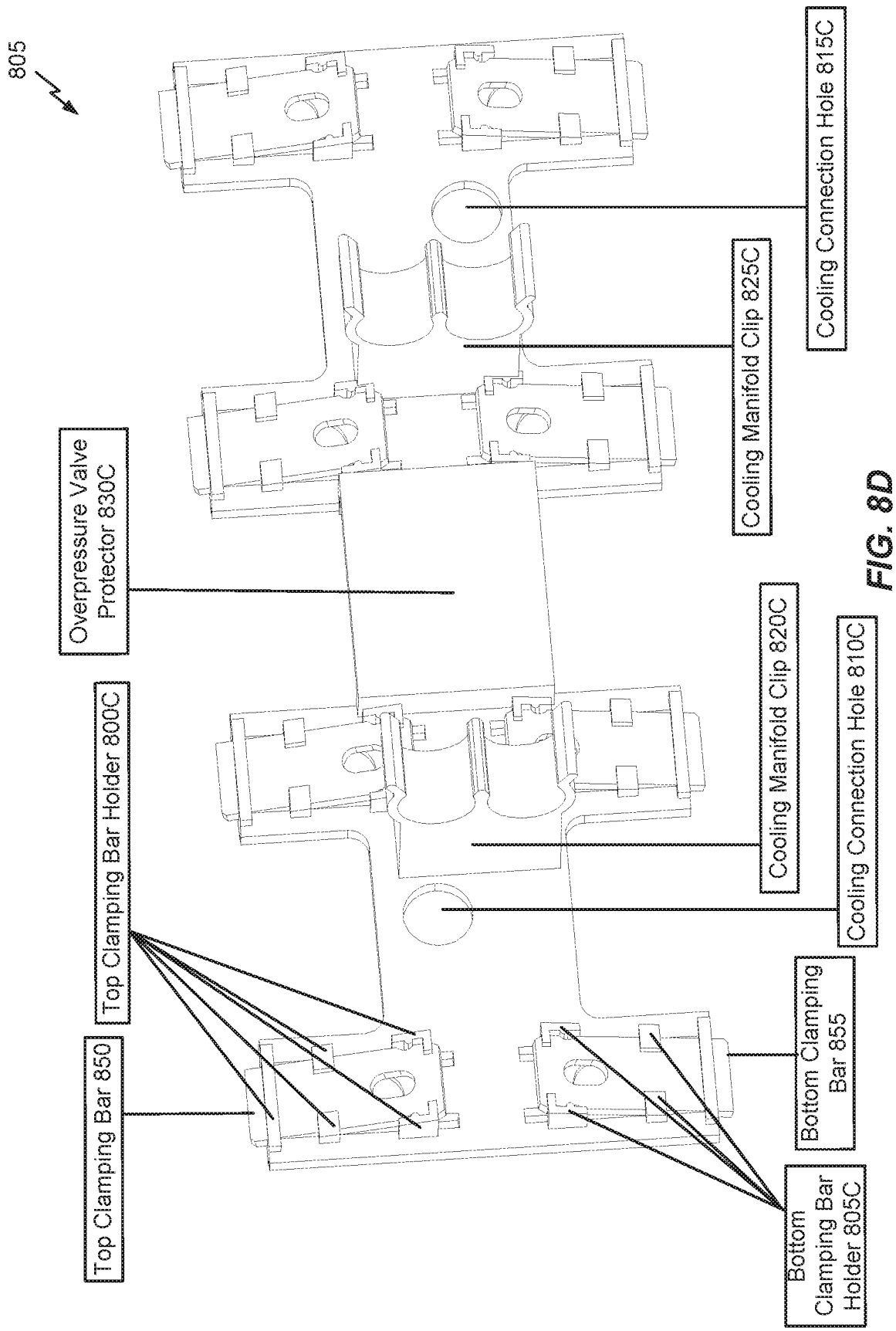
FIG. 8D illustrates a clamping bar holder component holding a plurality of top and bottom clamping bars in accordance with another embodiment of the disclosure.

FIG. 8D illustrates the clamping bar holder component 805 holding a plurality of top and bottom clamping bars in accordance with another embodiment of the disclosure. In FIG. 8D, the plurality of top and bottom clamping bars are each depicted in a "parked" state, whereby the plurality of top and bottom clamping bars are secured (or held in place) by respective clamping bar holders inside of a respective clearance threshold (e.g., an upper clearance threshold for the top clamping bars or a lower clearance threshold for the bottom clamping bars) to permit the battery module to be inserted into the battery module compartment and/or to be removed from the battery module compartment. The characteristics of the parked state will be described in more detail below. Aside from the parked vs. unparked distinction noted above, FIG. 8D is identical to FIG. 8C and as such will not be described further at this point for the sake of brevity.

Figure 9A:
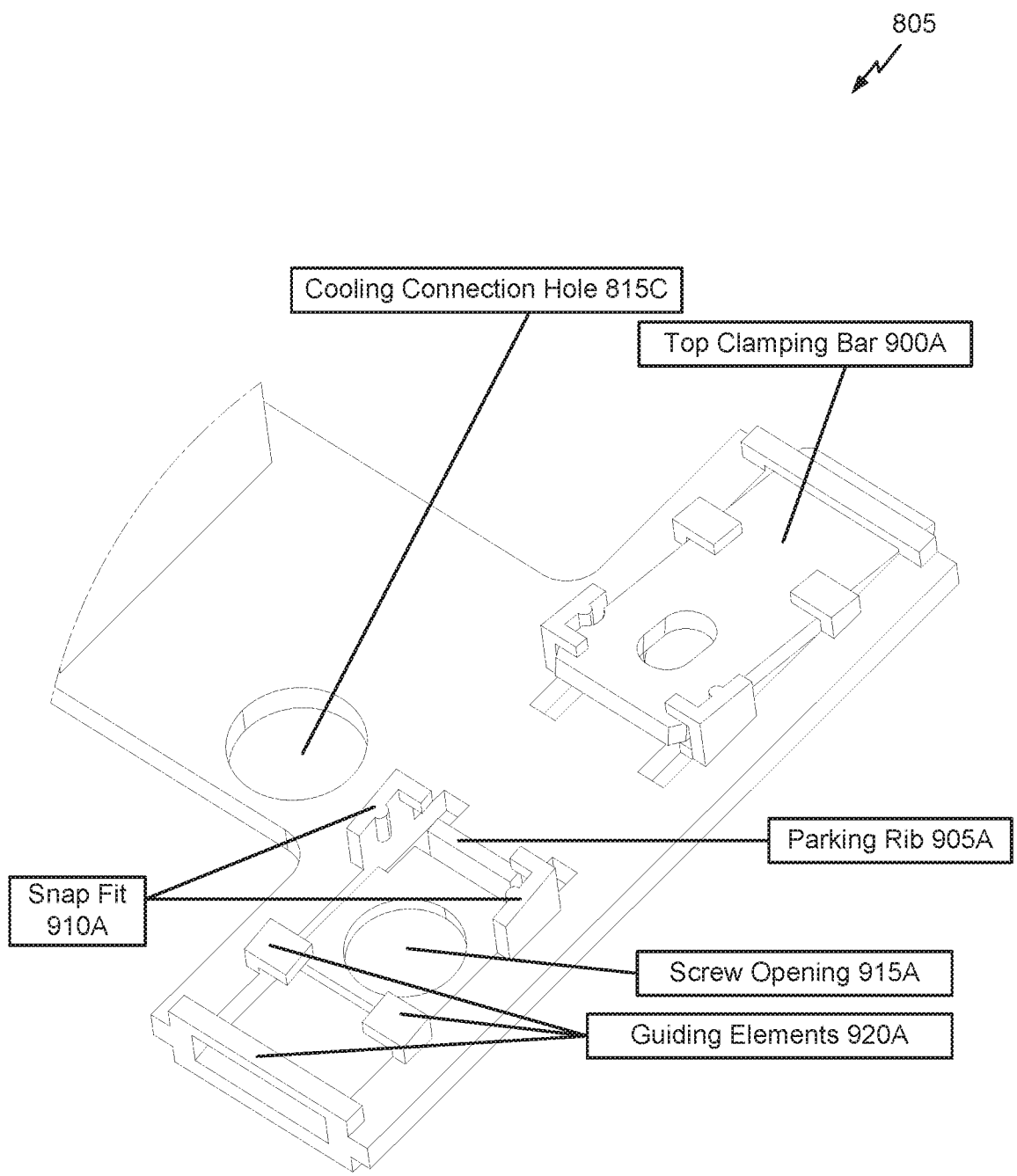
FIG. 9A illustrates a portion of the clamping bar holder component of FIG. 8D in accordance with an embodiment of the disclosure.

FIG. 9A illustrates a portion of the clamping bar holder component 805 in accordance with an embodiment of the disclosure. In particular, a top clamping bar holder containing a top clamping bar 900A in the parked state is depicted along with a bottom clamping bar holder that does not include a bottom clamping bar to more clearly depict the geometric elements of the bottom clamping bar holder. In the embodiment of FIG. 9A, the bottom clamping bar includes a parking rib 905A, a snap fit 910A, a screw opening 915A, and guiding elements 920A. In a parked state, a bottom clamping bar (not shown in FIG. 9A) will be clamped between the parking rib 905A and the snap fit 910A so as to retain the bottom clamping bar inside of a respective clearance threshold. In the unparked state, a bottom clamping bar (not shown in FIG. 9A) will slide to a lower position such that a bottom part extends out of the bottom clamping bar holder past the respective clearance threshold. As will be appreciated, the above-noted aspects described with respect to the bottom clamping bar holder and bottom clamping bar are reversed or flipped for a top clamping bar.

Referring to FIG. 9A, during a transition from a parked state to an unparked state (e.g., which may occur via brute force or alternatively by using an unparking tool, as will be described below in more detail), the bottom clamping bar will unsnap from the snap fit 910A and will slide under the guiding elements 920A so as to extend out of the bottom clamping bar holder past the clearance threshold. During a transition from an unparked state to a parked state (e.g., which may occur after a screw is at least partially unscrewed from the endplate 810 through the screw opening 915A, either by pushing the clamping bar back by hand or using a separate tool), the bottom clamping bar will slide back into the bottom clamping bar holder inside of the clearance threshold, and will then snap into the snap fit 910A, which secures the bottom clamping bar against the parking rib 905A. Again, while FIG. 9A is described with respect to the geometric elements of a bottom clamping bar holder, a top clamping bar holder may be arranged in a similar manner (e.g., inverted from the arrangement of the bottom clamping bar holder).

Referring to FIG. 9A, it will be appreciated that the snap fit 910A is one example of a clamping bar holding mechanism that holds a respective clamping bar in place while the respective clamping bar is in the parked state. Other embodiments may be directed to other types of clamping bar holding mechanism that can hold the respective clamping bar in a non-permanent manner while in the parked state. For example, another clamping bar holding mechanism that may be used is a fastening material such as Velcro, a sticky material, etc.

Figure 9B:
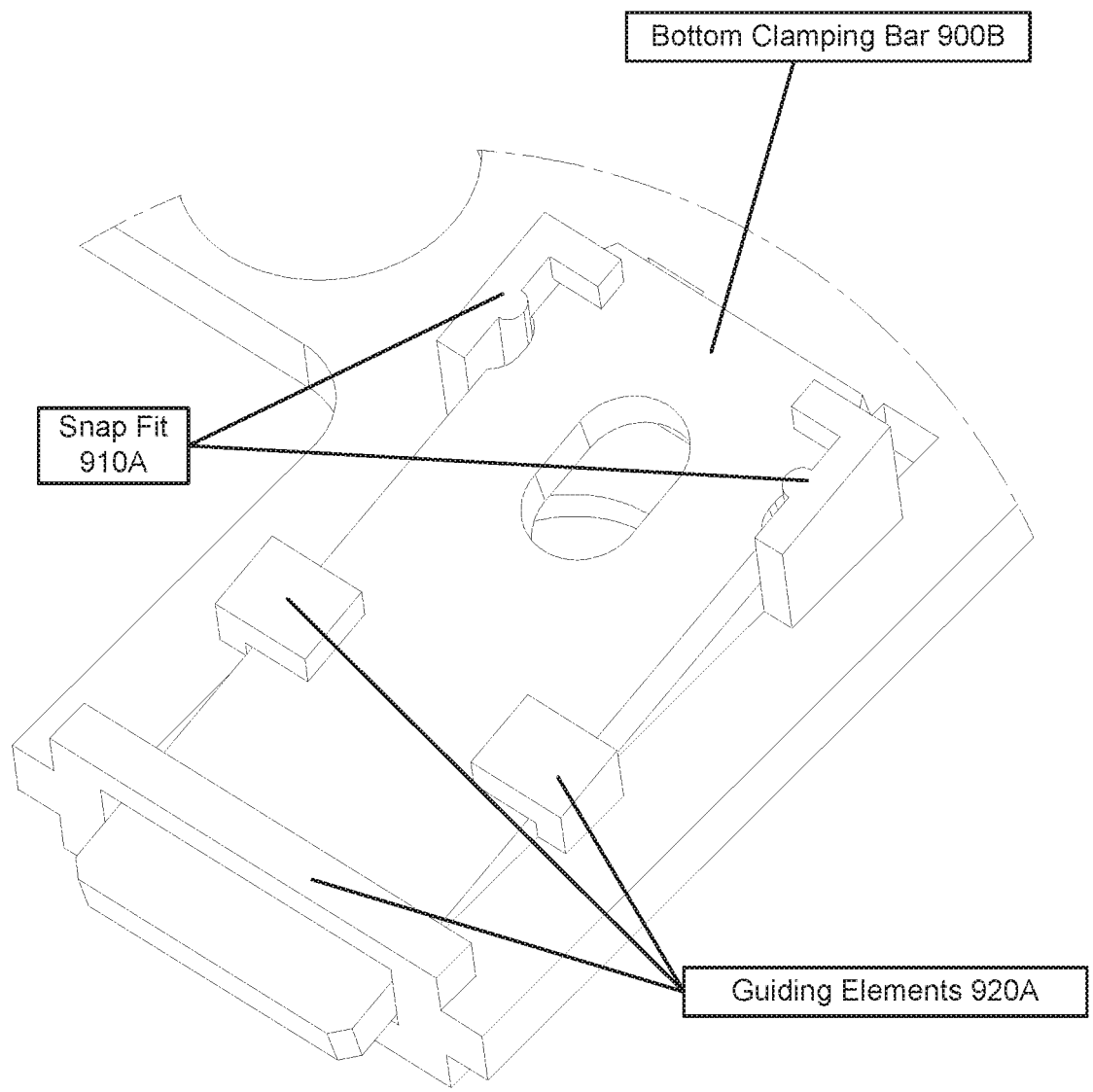
FIGS. 9B-9C illustrate perspectives of a bottom clamping bar holder with a bottom clamping bar arranged therein in accordance with an embodiment of the disclosure.
Figure 9C:
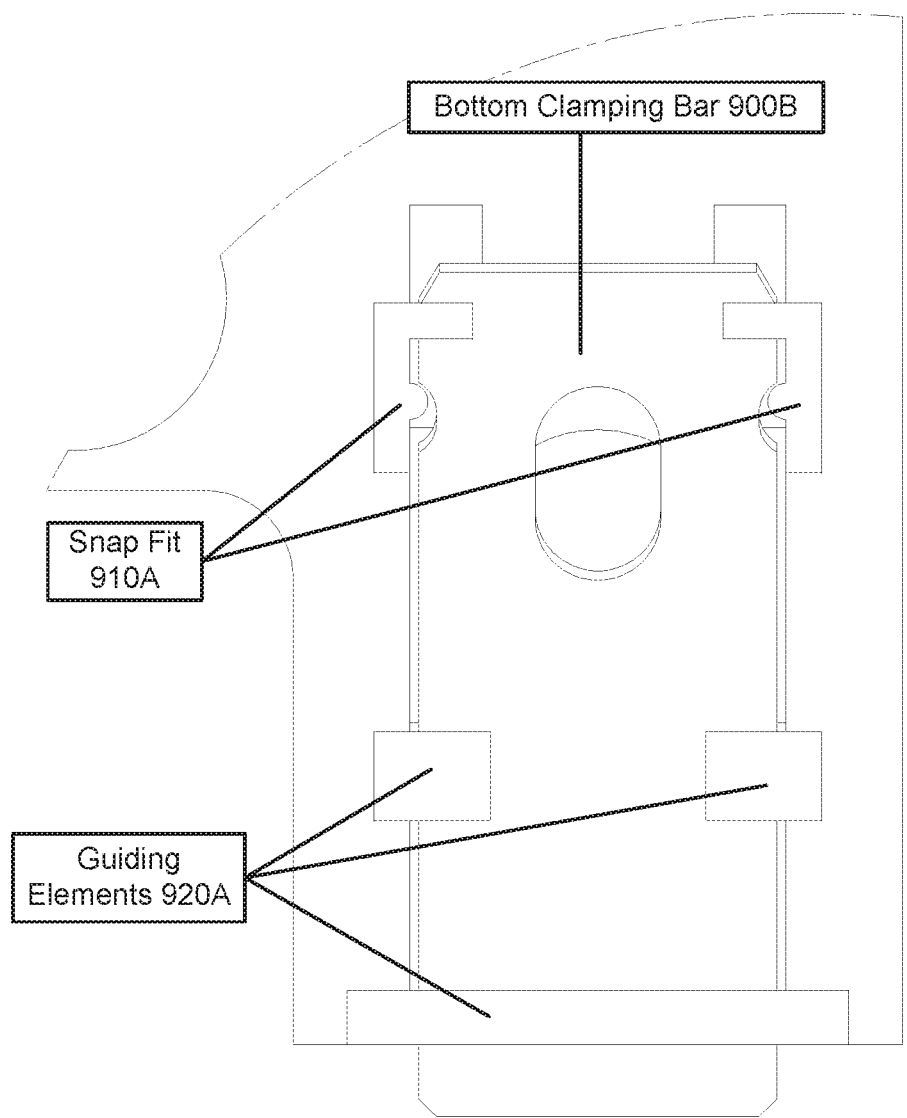

FIGS. 9B-9C illustrate perspectives of the bottom clamping bar holder of FIG. 9A with a bottom clamping bar 900B arranged therein in accordance with an embodiment of the disclosure. In particular, FIG. 9B shows an isometric-perspective of the bottom clamping bar holder of FIG. 9A and FIG. 9C shows a front-perspective of the bottom clamping bar holder of FIG. 9A. In FIGS. 9B-9C, the bottom clamping bar 900B is arranged inside of the bottom clamping bar holder of FIG. 9A in a parked state. So, the bottom clamping bar 900B is snapped into the snap fit 910A and is held in place between the snap fit 910 and the parking rib 905A (not visible in FIG. 9B).

As shown in FIG. 9C, the snap fit 910A may include protrusions (e.g., ridges, bubbles, etc.) that are aligned with grooves in the bottom clamping bar 900B. During a transition from the unparked state to the parked state, a top part of bottom clamping bar 900B slides over the snap fit 910A until the grooves snap onto these protrusions, which helps to hold the clamping bars in position in the parked state. In other embodiments, the snap fit 910A may include grooves while the bottom clamping bar 900B includes protrusions to facilitate the snap-like connection. During a transition from the parked state to the unparked state, the screw through the clamping bar is tightened, which causes the snap fit 910A to bend so that the clamping bar is unsnapped and is permitted to move outwards. Alternatively, an unparking tool (described below in more detail) may be used to unsnap the clamping bar.

In various embodiments of the disclosure, a clamping bar in the parked state does not necessarily require the clamping bar to be fully enveloped by the clamping bar holder component 805. As shown in FIGS. 9B-9C for instance, the bottom clamping bar 900B extends slightly out of the bottom clamping bar holder through the guiding elements 920A. In an example, any extension of the clamping bar outside of its respective clamping bar holder in the parked state is maintained inside of a clearance threshold that permits the battery module to be inserted and/or removed from the battery module compartment. In context with FIG. 8A for instance, the clearance threshold may be based on a position of the groove-locking components 830 and 835 (e.g., if a clamping bar extends too far out from its clamping bar holder, the clamping bar will contact the groove-locking components during an attempt to remove or insert the battery module). In another embodiment where the clamping bars lock onto holes in the top and bottom folded compartment sections (e.g., as shown in FIGS. 4A-6E), the clearance threshold may be based on a position of the top and bottom folded compartment sections.

Figure 10A:
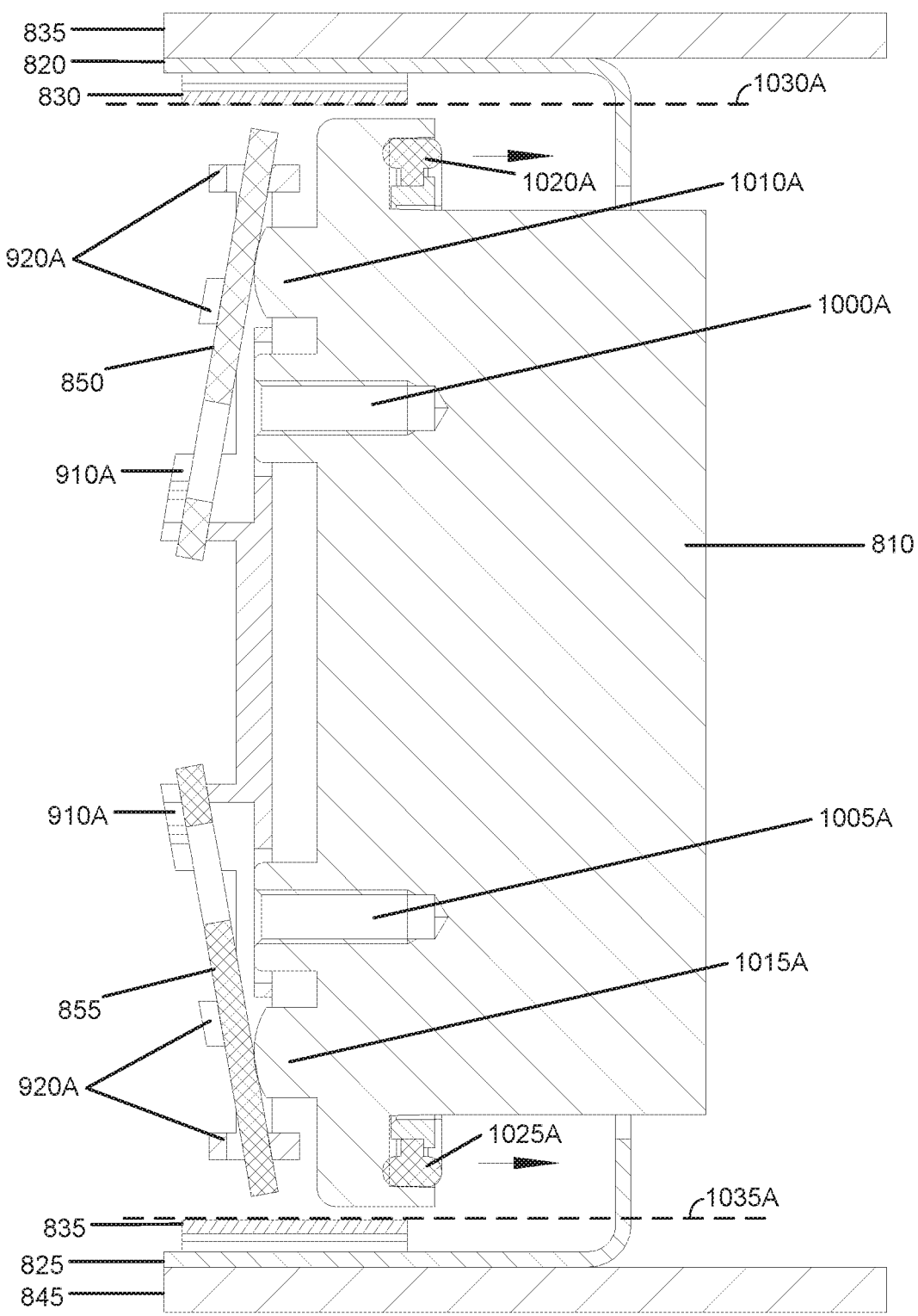
FIG. 10A illustrates a side-perspective of a battery module during insertion into a battery module compartment in accordance with an embodiment of the disclosure.

FIG. 10A illustrates a side-perspective of a battery module during insertion into a battery module compartment in accordance with an embodiment of the disclosure. In particular, the endplate 810 of the battery module as well as surrounding components are shown in FIG. 10A.

Referring to FIG. 10A, both the top clamping bar 850 and the bottom clamping bar 855 are shown in the parked state. So, the top and bottom clamping bars 850 and 855 each snapped into a respective snap fit 910A, and are clamped in between the snap fits 910 and respective parking ribs 905A. A top part of the top clamping bar 850 is kept short of a top clearance threshold 1030A so as to avoid impacting a bottom side of the top groove-locking component 830 during insertion/removal of the battery module, and a bottom part of the bottom clamping bar 855 likewise is kept short of a bottom clearance threshold 1035A to avoid impacting a top side of the bottom groove-locking component 835 during insertion/removal of the battery module. Hence, the battery module in FIG. 10A is configured for insertion (e.g., assuming the other clamping bars which are not shown in FIG. 10A are also in the parked state).

In FIG. 10A, threaded screw holes 1000A-1005A are depicted. While not shown expressly in FIG. 10A, upon insertion, screws may be screwed into the screw holes 1000A-1005A (e.g., through respective screw openings of the top and bottom clamping bars 850-855 and the screw openings 915A of respective clamping bar holders) to facilitate a transition of the top and bottom clamping bars 850-855 into the unparked state. As noted above, in other embodiments, rivets or pieces of metal may be used as the attachment mechanism instead of screws.

Referring to FIG. 10A, bulged endplate sections 1010A-1015A are depicted, while the clamping bars 850-855 are not bulged. As the screws (not shown) through the respective clamping bars 850-855 are tightened, the clamping bars 850-855 undergo permanent plastic deformation such that a homogeneous clamping force is obtained by equalizing the tolerances. In contrast to FIGS. 4A-7B, FIG. 10A depicts an example whereby the 'bulge' at the contact point between the clamping bar and the endplate is moved to the endplate instead of being integrated as part of the clamping bar. So, the bulge can be arranged on either the endplate or the clamping bar in various embodiments. Also shown in FIG. 10A are sealing components 1020A-1025A, which may be implemented as one continuous seal (e.g., a rubber gasket) as described above, in an example.

As shown in FIG. 10A, while the screws (or bolts) are not expressly shown, in the parked state, positions of the clamping bars 850-855 are angled and are not parallel with the bolt heads of the screws. By tightening the screws into the endplate 810, the contact between the bolt heads and clamping bars 850-855, the clamping bars 850-855 will be pushed (e.g., flipped) to the outside.

Figure 10B:
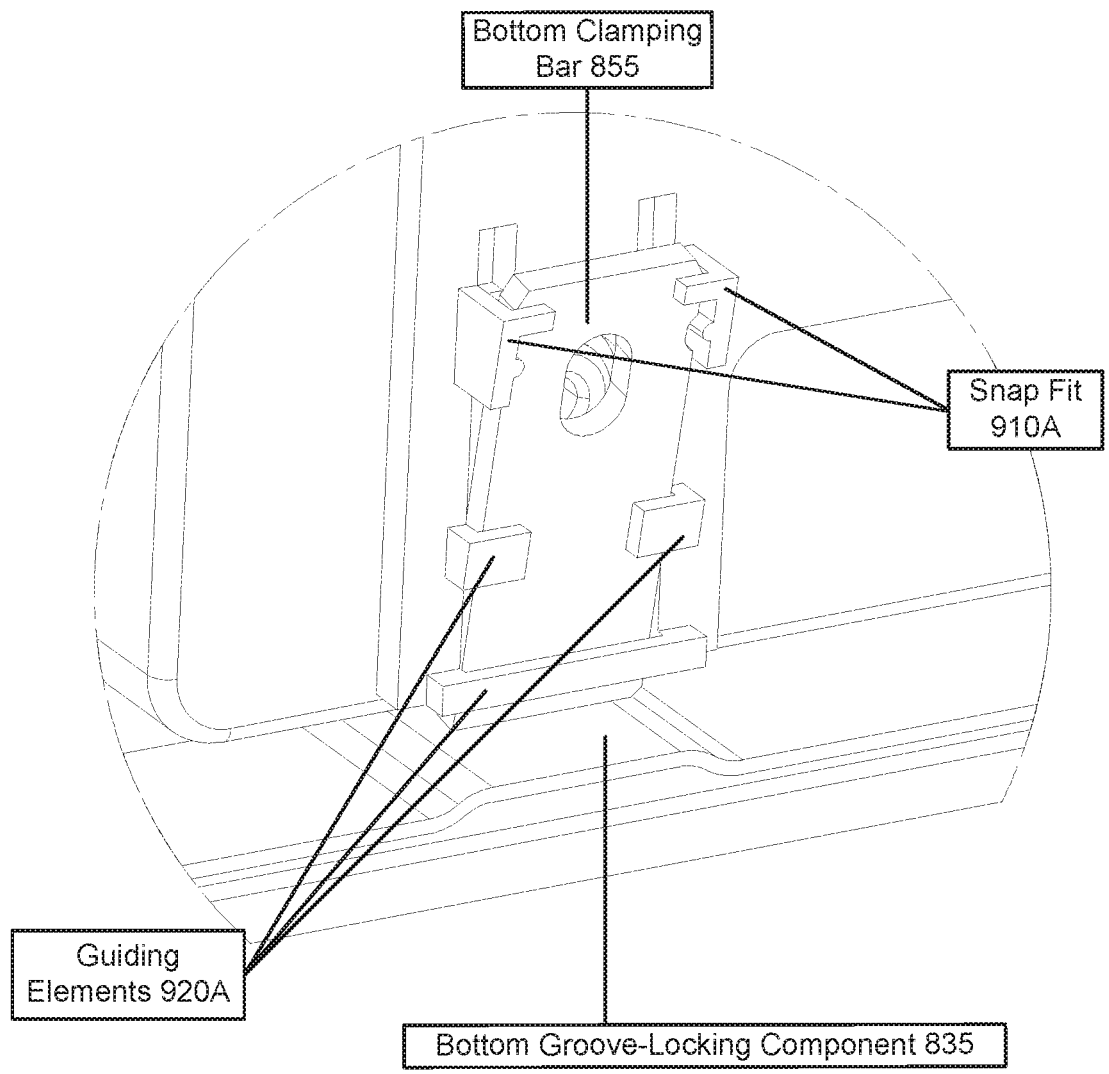
FIG. 10B illustrates an isometric-perspective of a bottom clamping bar during battery module insertion in accordance with an embodiment of the disclosure.

FIG. 10B illustrates an isometric-perspective of the bottom clamping bar 855 of the battery module during the battery module insertion depicted in FIG. 10A in accordance with an embodiment of the disclosure. Once again, a bottom part of the bottom clamping bar 855 clears (i.e., does not impact) the bottom groove-locking component 835 during the battery module insertion, because the bottom part is kept short of the bottom clearance threshold 1035A while the bottom clamping bar is in the parked state.

Figure 10C:
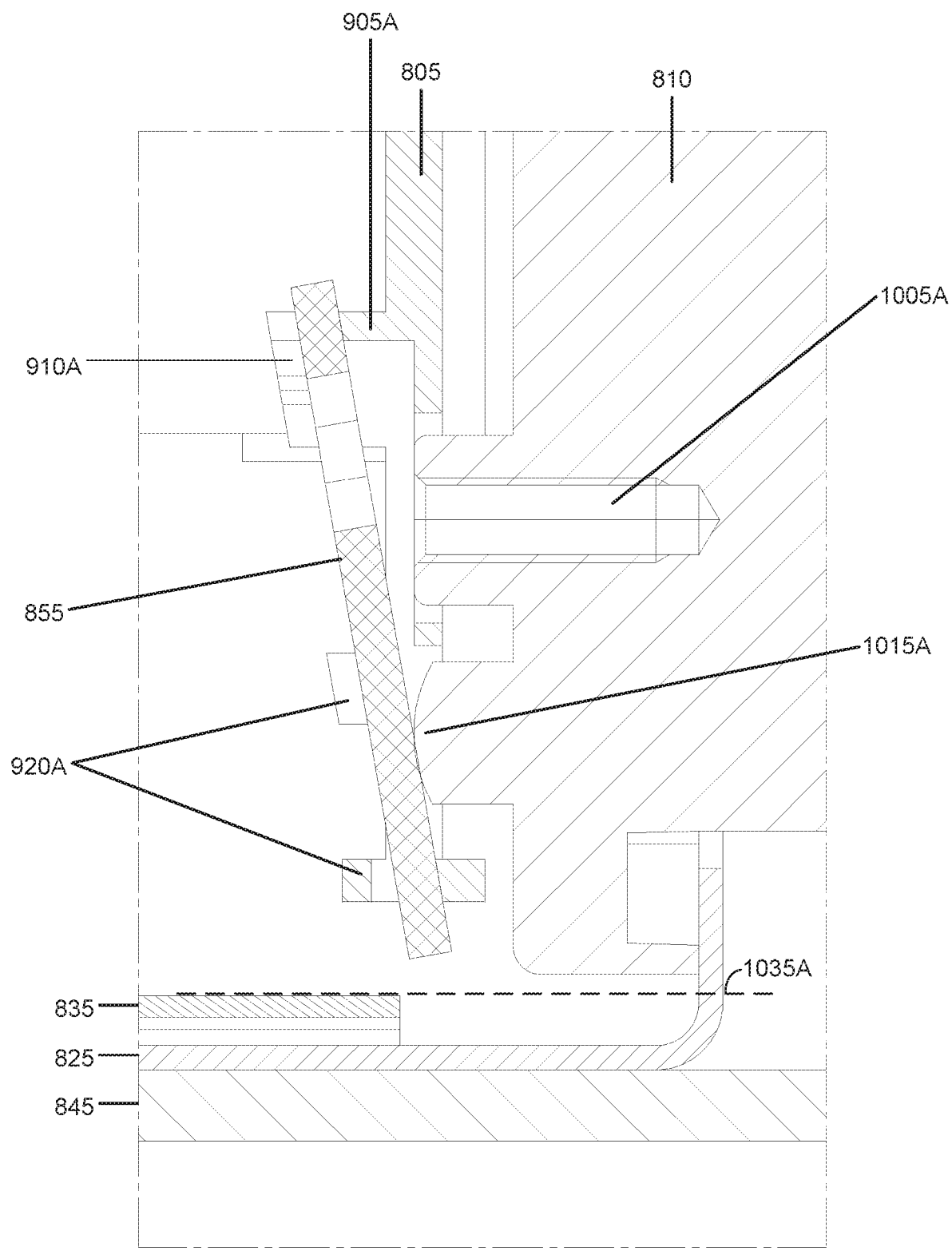
FIG. 10C illustrates a side-perspective of a bottom clamping bar after a battery module is fully inserted into a battery module compartment and before the bottom clamping bar is transitioned into an unparked state in accordance with an embodiment of the disclosure.

FIG. 10C illustrates a side-perspective of the bottom clamping bar 855 after the battery module shown in FIG. 10A is fully inserted into the battery module compartment and before the bottom clamping bar 855 is transitioned into an unparked state in accordance with an embodiment of the disclosure. Certain components (e.g., the sealing components 1020A-1025A, etc.) are omitted to simplify the illustration of FIG. 10C, but are understood to be present.

Figure 11A:
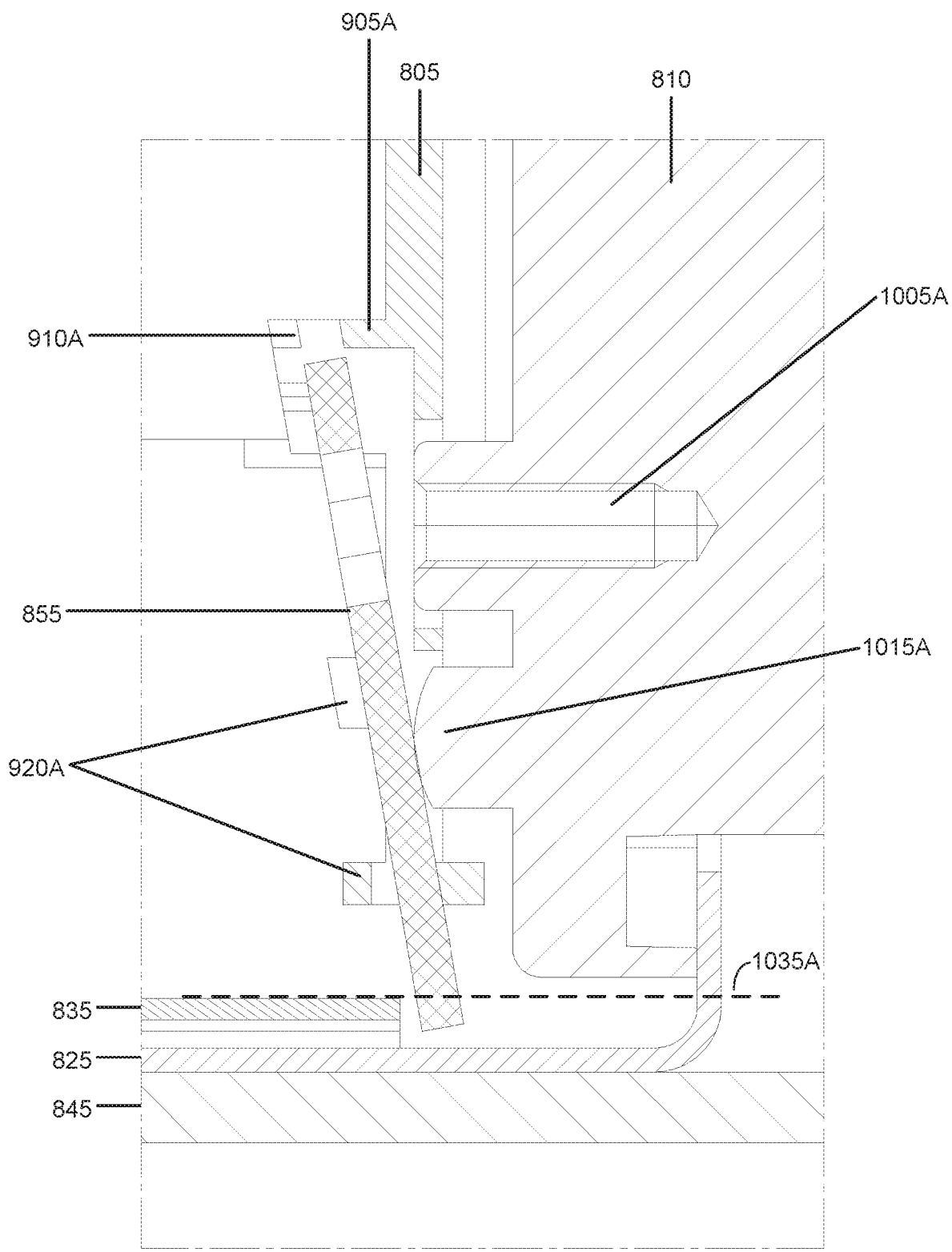
FIG. 11A illustrates a side-perspective of a bottom clamping bar after the battery module shown in FIG. 10A is fully inserted into the battery module compartment and after the bottom clamping bar is shifted into the unparked state in accordance with an embodiment of the disclosure.
Figure 11B:
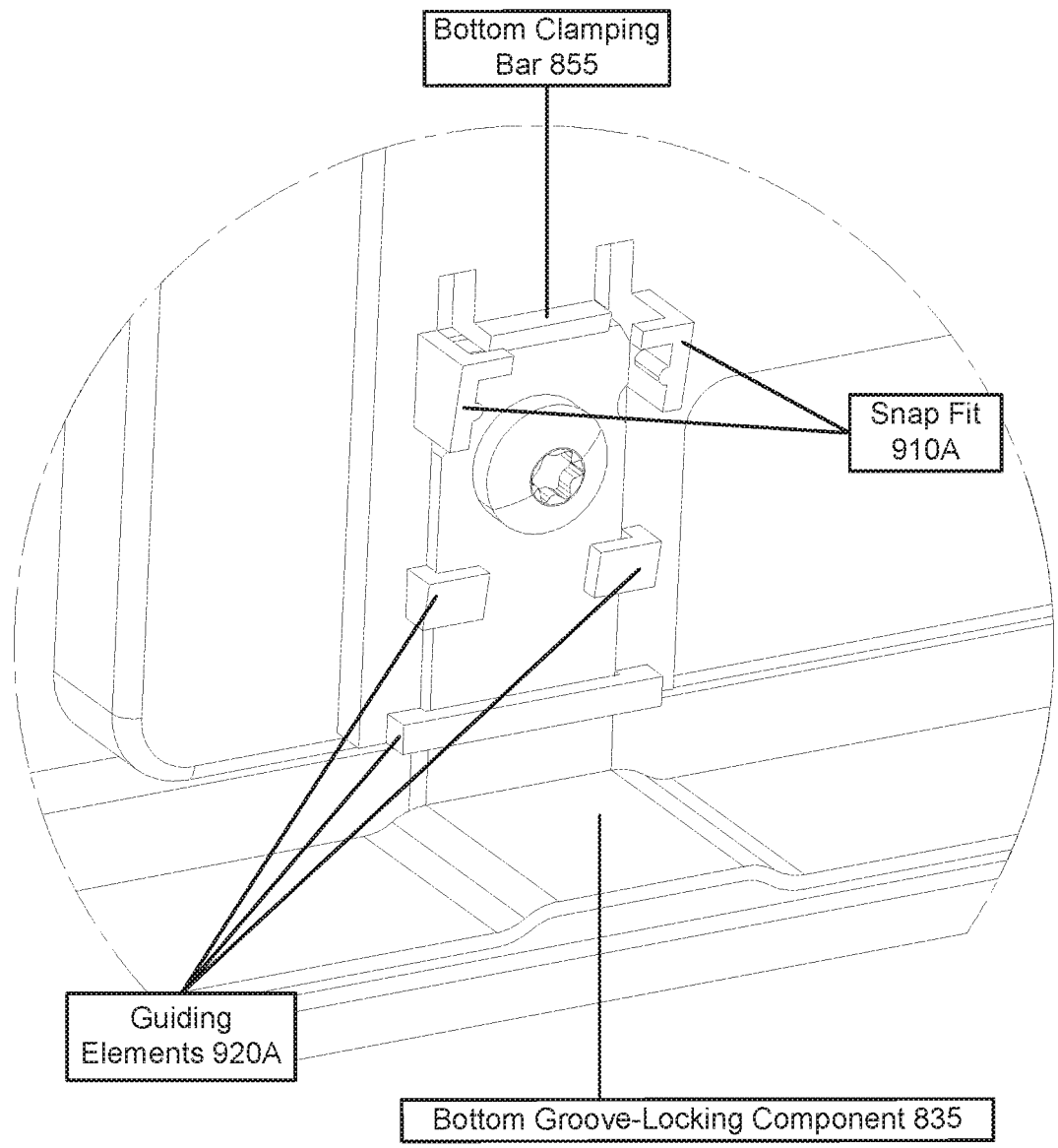
FIG. 11B illustrates a side-perspective of the bottom clamping bar in the unparked state as shown in FIG. 11A in accordance with an embodiment of the disclosure.

FIG. 11A illustrates a side-perspective of the bottom clamping bar 855 after the battery module shown in FIG. 10A is fully inserted into the battery module compartment and after the bottom clamping bar 855 is shifted into the unparked state in accordance with an embodiment of the disclosure. In FIG. 11A, the bottom clamping bar 855 is unsnapped from the snap fit 910A and no longer rests against the parking rib 905A. Relative to the parked state as depicted in FIG. 10C, the bottom clamping bar 855 is lowered such that a bottom part of the bottom clamping bar 855 extends past the bottom clearance threshold. While the bottom clamping bar 855 is shown in the unparked state in FIG. 11A, the bottom clamping bar 855 is not yet configured to clamp the endplate 810 to the battery module compartment. FIG. 11B illustrates a side-perspective of the bottom clamping bar 855 in the unparked state as shown in FIG. 11A in accordance with an embodiment of the disclosure.

FIGS. 12A-12D illustrate an example transition sequence of a pair of top and bottom clamping bars from the parked state (e.g., as in FIGS. 10A-10C) to the unparked state (e.g., as in FIGS. 11A-11B) in accordance with an embodiment of the disclosure.

Figure 12A:
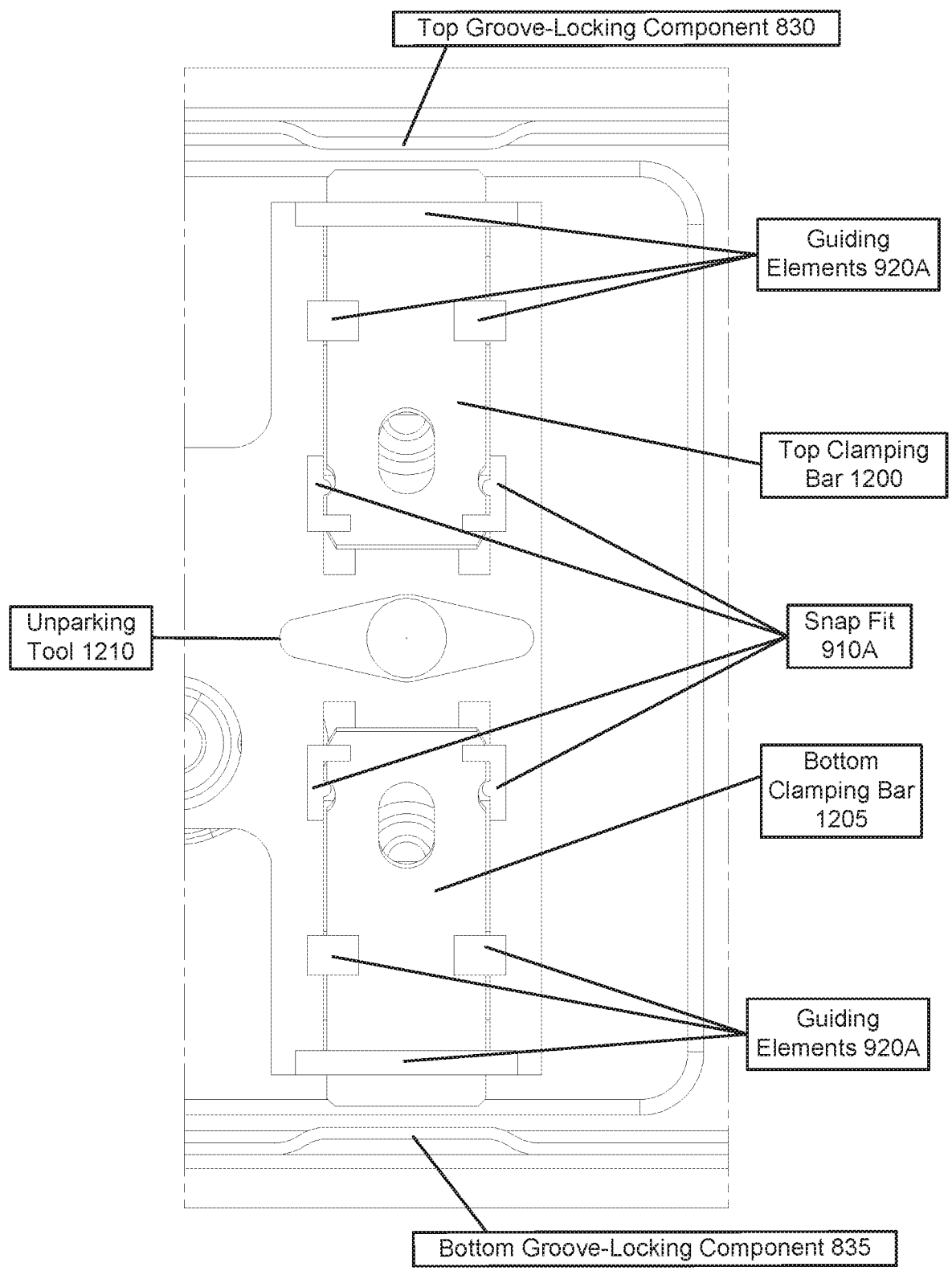
FIGS. 12A-12D illustrate an example transition sequence of a pair of top and bottom clamping bars from the parked state (e.g., as in FIGS. 10A-10C) to the unparked state (e.g., as in FIGS. 11A-11B) in accordance with an embodiment of the disclosure.

Referring to FIG. 12A, top and bottom clamping bars 1200 and 1205 are shown in the parked state. At this point, an unparking tool 1210 is arranged (e.g., by a human technician or a machine) between the top and bottom clamping bars 1200 and 1205. In an example, the unparking tool 1210 may be made from plastic, metal or some other suitable material.

Figure 12B:
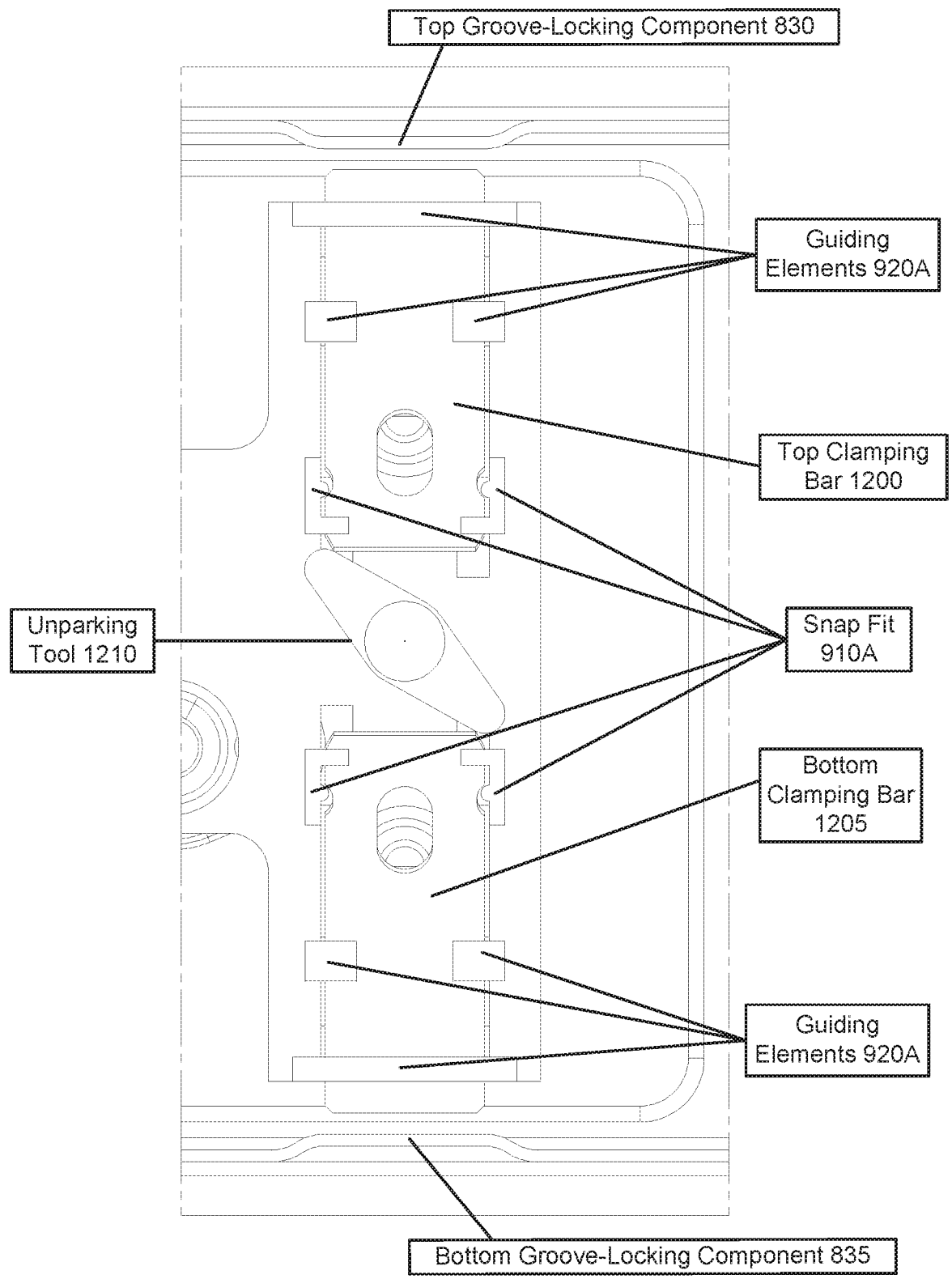

Referring to FIG. 12B, the unparking tool 1210 starts to turn, which places opposite ends of the unparking tool 1210 into contact with the top and bottom clamping bars 1200 and 1205, which are still in the parked state at this point.

Figure 12C:
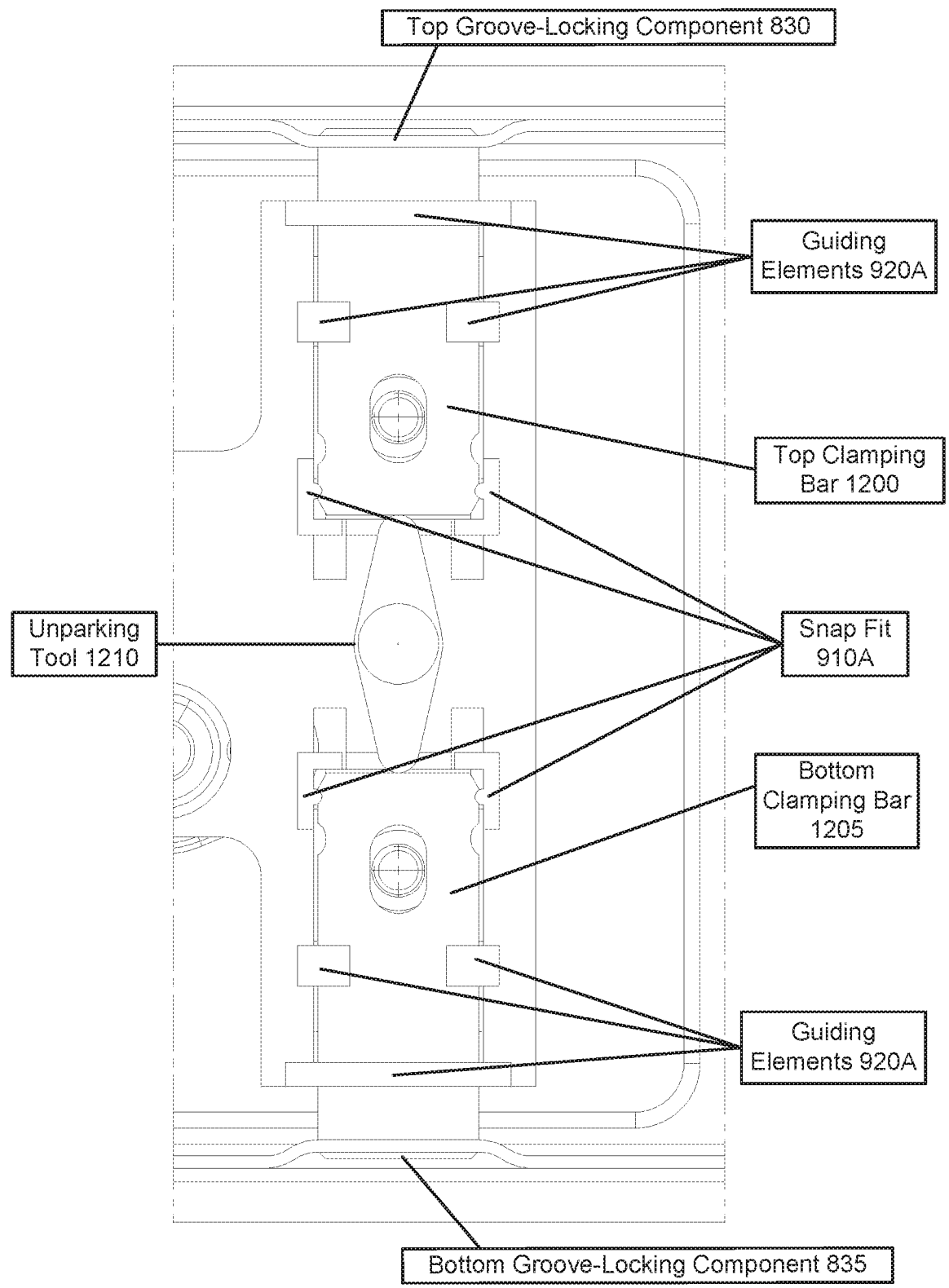

Referring to FIG. 12C, the unparking tool 1210 continues to turn, which places upward force onto the top clamping bar 1200 and downward force onto the clamping bar 1205. The respective upward and downward force unsnaps the top and bottom clamping bars 1200 and 1205 from the snap fit 910A, and moves the top and bottom clamping bars 1200 and 1205 into the unparked state.

Figure 12D:
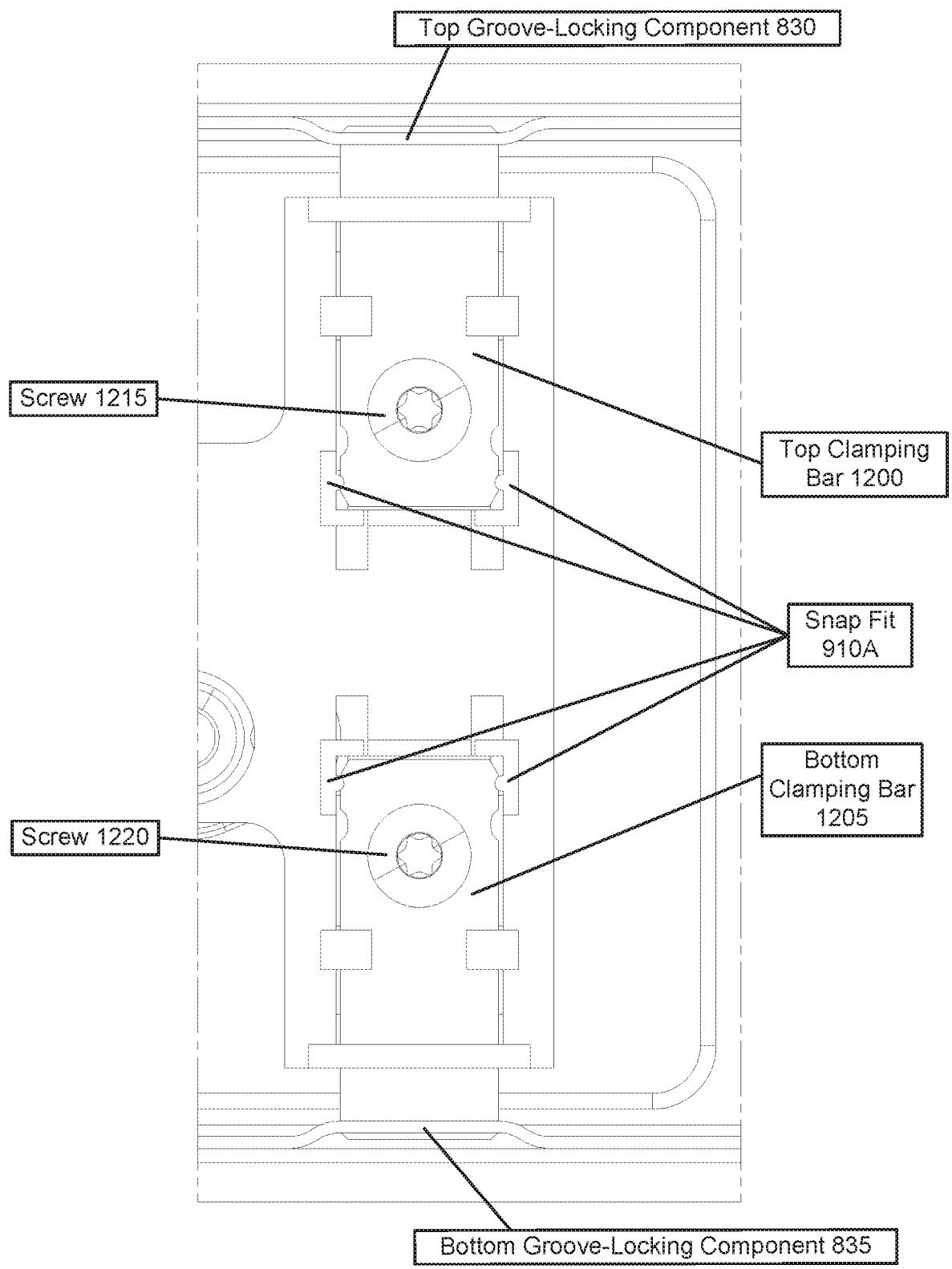

Referring to FIG. 12D, the unparking tool 1210 is removed, and the top and bottom clamping bars 1200 and 1205 are secured with screws 1215 and 1220. In an example, the unparking tool 1210 may be removed after the screws 1215 and 1220 are added. In an alternative example, the protrusions that keep the top and bottom clamping bars 1200 and 1205 snapped in place in the parked state may be further configured to temporarily secure the top and bottom clamping bars 1200 and 1205 in the unparked state. In this case, the unparking tool 1210 can be removed before the screws 1215 and 1220 are added, as the top clamping bar 1200 will not simply fall out of the unparked state as soon as the unparking tool 1210 is removed.

While the sequence of FIGS. 12A-12D adds the screws 1215-1220 starting with FIG. 12D, in other embodiments the screws 1215-1220 may be partial screwed into the endplate before the battery module is inserted (e.g., to attach the clamping bar holder component to the endplate prior to battery module insertion). In this case, the screws 1215-1220 may be present during the operations depicted in FIGS. 12A-12C, even though this is not expressly shown.

Figure 13A:
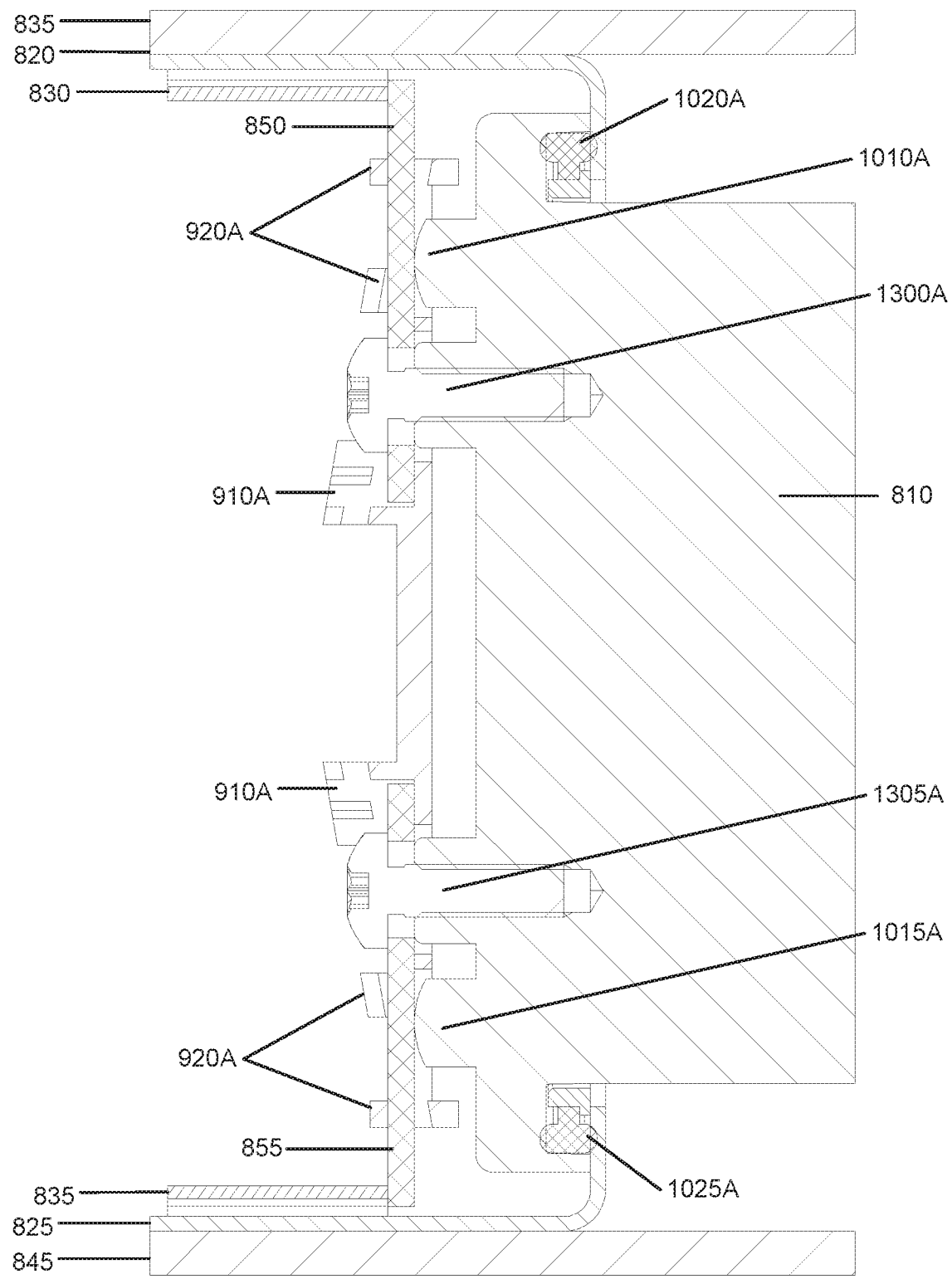
FIG. 13A illustrates a side-perspective of a battery module after the battery module shown in FIG. 10A is fully inserted into the battery module compartment, after the top and bottom clamping bars are shifted into the unparked state (e.g., as in FIGS. 11A-12D), and after the top and bottom clamping bars are locked against top and bottom groove-locking components, respectively, in accordance with an embodiment of the disclosure.

FIG. 13A illustrates a side-perspective of a battery module after the battery module shown in FIG. 10A is fully inserted into the battery module compartment, after the top and bottom clamping bars 850-855 are shifted into the unparked state (e.g., as in FIGS. 11A-12D), and after the top and bottom clamping bars 850-855 are locked against the top and bottom groove-locking components 830 and 835, respectively, in accordance with an embodiment of the disclosure. In particular, the top and bottom clamping bars 850-855 are locked against the top and bottom groove-locking components 830 and 835 based on screws 1300A-1305A being screwed into the screw holes 1000A-1005A, respectively, as shown in FIG. 10A.

Figure 13B:
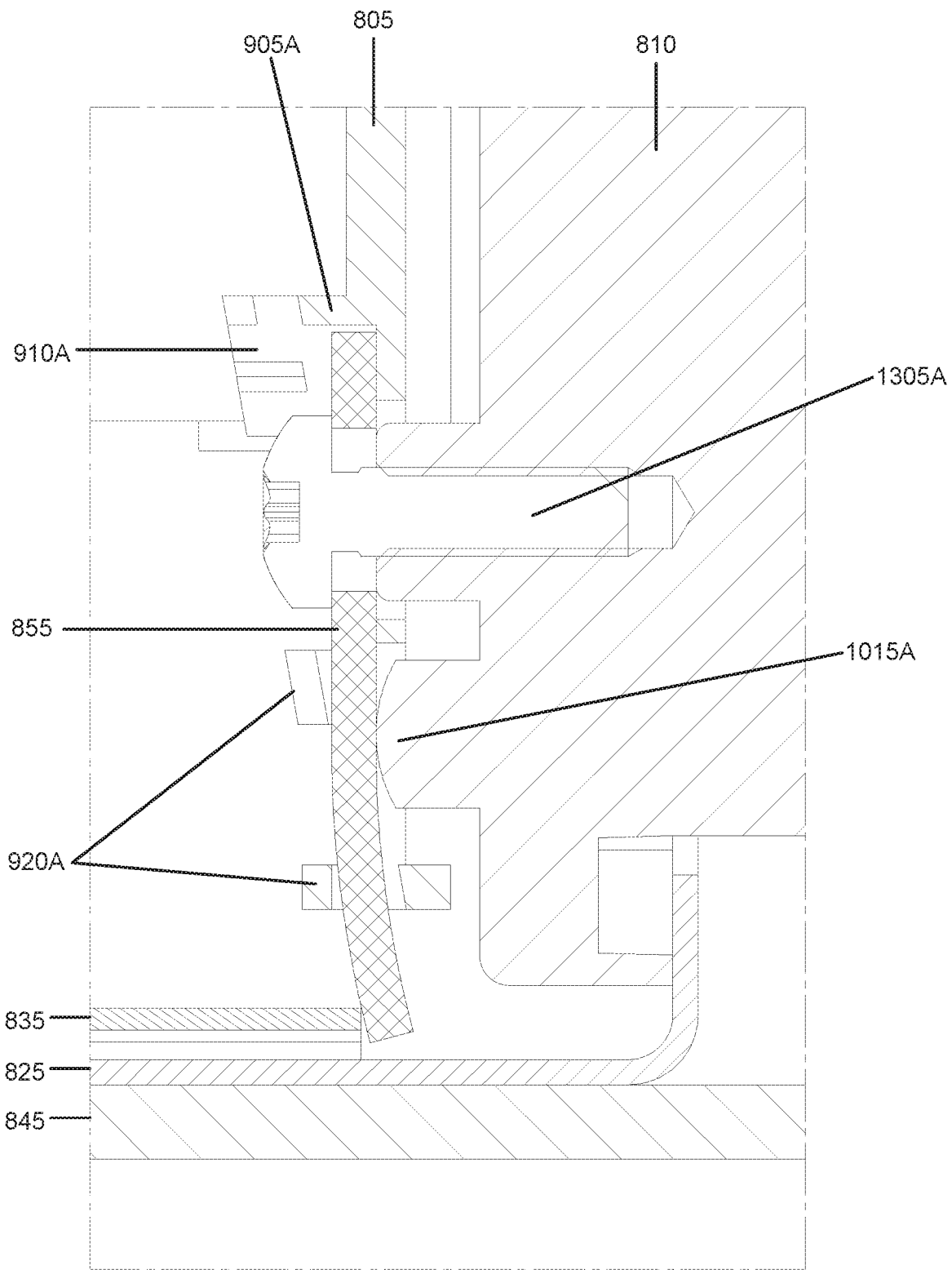
FIG. 13B illustrates a side-perspective of the bottom clamping bar in FIG. 13A as a screw is further tightened in accordance with an embodiment of the disclosure.

FIG. 13B illustrates a side-perspective of the bottom clamping bar 855 in FIG. 13A as the screw 1305A is further tightened in accordance with an embodiment of the disclosure. In FIG. 13B, as the screw 1305A is further tightened, clamping pressure is applied between the endplate 810 and the battery module compartment as discussed in various embodiments above. As the screw 1305A is tightened and the clamping pressure is increased, the bottom clamping bar 855 is permanently deformed (i.e., plastic deformation) as shown in FIG. 13B, which ensures a homogenous clamping force that equalizes the tolerances.

Figure 14:
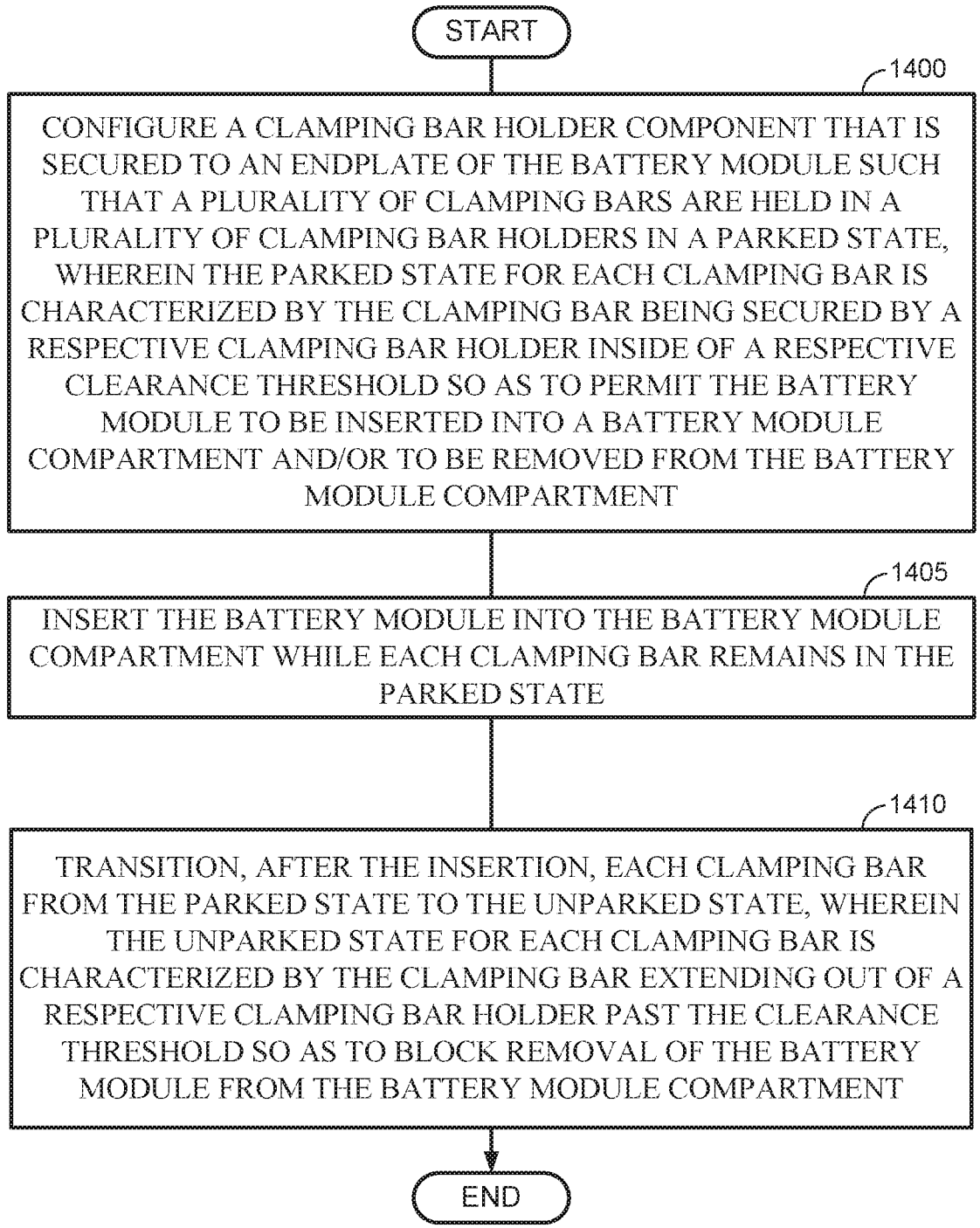
FIG. 14 illustrates a process of inserting a battery module into a battery module compartment in accordance with an embodiment of the disclosure.

FIG. 14 illustrates a process of inserting a battery module into a battery module compartment in accordance with an embodiment of the disclosure. In an example, the process of FIG. 14 may be performed by a battery handling entity (e.g., a human technician, a machine configured to auto-insert battery modules into battery module compartments, etc.) with respect to the components described above in FIGS. 8A-13B.

Referring to FIG. 14, at block 1400, the battery handling entity configures a clamping bar holder component that is secured to an endplate of the battery module such that a plurality of clamping bars are held in a plurality of clamping bar holders in a parked state, wherein the parked state for each clamping bar is characterized by the clamping bar being secured by a respective clamping bar holder inside of a respective clearance threshold so as to permit the battery module to be inserted into a battery module compartment and/or to be removed from the battery module compartment. Examples of clamping bar holder components configured as in block 1400 are shown in FIGS. 8A-8B, 8D-10C, 12A-12B.

Referring to FIG. 14, at block 1405, the battery handling entity inserts the battery module into the battery module compartment while each clamping bar remains in the parked state (e.g., as shown in FIGS. 10A-10C). At block 1410, the battery handling entity transitions, after the insertion of block 1405, each clamping bar from the parked state to the unparked state, wherein the unparked state for each clamping bar is characterized by the clamping bar extending out of a respective clamping bar holder past the clearance threshold so as to block removal of the battery module from the battery module compartment. For example, the battery handling entity may use the unparking tool 1210 for the transition of block 1410. After block 1410, an attachment mechanism is applied between each clamping bar and the endplate to clamp the endplate to the battery module compartment. For example, the attachment mechanism may include screws, rivets, pieces of welded metal or any combination thereof.

Figure 15:
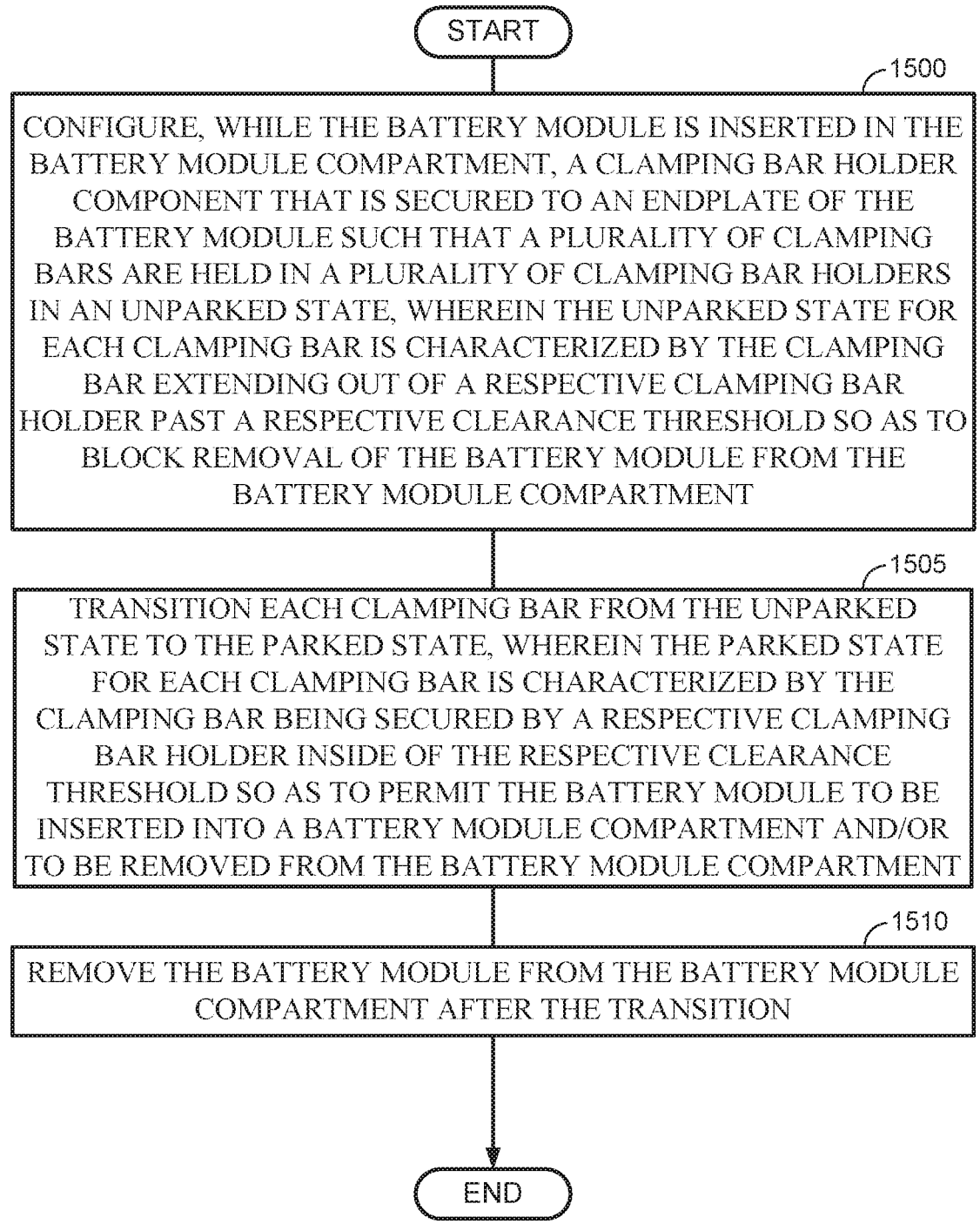
FIG. 15 illustrates a process of removing a battery module from a battery module compartment in accordance with an embodiment of the disclosure.

FIG. 15 illustrates a process of removing a battery module from a battery module compartment in accordance with an embodiment of the disclosure. Similar to FIG. 14, in an example, the process of FIG. 15 may be performed by a battery handling entity (e.g., a human technician, a machine configured to auto-remove battery modules into battery module compartments, etc.). While some of the above-noted FIGS. are specific to insertion of the battery module, it will be appreciated that battery module removal is similar to insertion (except in the opposite direction), such that the insertion-specific FIGS. are intended to be representative of battery module removal in addition to battery module insertion (e.g., FIG. 10A can represent battery module removal by reversing the arrows depicting battery module movement, etc.).

Referring to FIG. 15, at block 1500, the battery handling entity configures, while the battery module is inserted in the battery module compartment, a clamping bar holder component that is secured to an endplate of the battery module such that a plurality of clamping bars are held in a plurality of clamping bar holders in an unparked state, wherein the unparked state for each clamping bar is characterized by the clamping bar extending out of a respective clamping bar holder past a respective clearance threshold so as to block removal of the battery module from the battery module compartment. For example, the battery handling entity may use the unparking tool 1210 for the configuring of block 1500.

Referring to FIG. 15, at block 1505, the battery handling entity transitions each clamping bar from the unparked state to the parked state, wherein the parked state for each clamping bar is characterized by the clamping bar being secured by a respective clamping bar holder inside of the respective clearance threshold so as to permit the battery module to be inserted into a battery module compartment and/or to be removed from the battery module compartment. For example, during or after block 1505, an attachment mechanism between each clamping bar and the endplate is removed to unclamp the endplate from the battery module compartment, after which the clamping bar(s) can be manipulated into the unparked state. In an example, the the attachment mechanism may include screws, rivets, pieces of welded metal or any combination thereof. At block 1510, the battery handling entity removes the battery module from the battery module compartment after the transition of block 1505.

While the embodiments described above related primarily to scenarios where clamping bars are attached to battery module endplates via screws (or bolts), other embodiments may be directed to different types of attachment mechanisms between the clamping bars and battery module endplates. For example, instead of screws or bolts, rivets could be used as the attachment mechanism. In yet another example, a piece of metal may be inserted through a hole in a clamping bar, which is then welded to the battery module endplate. In this case, the attachment mechanism is a piece of welded metal. Accordingly, the various embodiments of the disclosure are not intended to be limited to screws or bolts as the clamping-bar-to-endplate attachment mechanism.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. A clamping bar holder component configured to be secured to an endplate of a battery module of an energy storage system, comprising:
   a plurality of clamping bar holders configured to hold a respective plurality of clamping bars and to facilitate transitions of each of the plurality of clamping bars between a parked state and an unparked state,
   wherein, in the parked state, each clamping bar is secured by a respective clamping bar holder inside of a respective clearance threshold outside of the battery module so as to permit the battery module to be inserted into a battery module compartment and/or to be removed from the battery module compartment,
   wherein, in the unparked state, each clamping bar extends out of the clamping bar holder past the clearance threshold outside of the battery module so as to block removal of the battery module from the battery module compartment, and
   wherein the plurality of clamping bar holders includes a first subset of clamping bar holders arranged across a first end of the clamping bar holder component and a second subset of clamping bar holders arranged across a second end of the clamping bar holder component, the first and second ends being opposing ends of the clamping bar holder component.

2. The clamping bar holder component of claim 1, wherein, in the unparked state, each clamping bar held by one of the first subset of clamping bar holders extends out of the clamping bar holder along a first direction, and
   wherein, in the unparked state, each clamping bar held by one of the second subset of clamping bar holders extends out of the clamping bar holder along a second direction that opposes the first direction.

3. The clamping bar holder component of claim 1, wherein each of the plurality of clamping bar holders includes:
   a clamping bar holding mechanism that holds a respective clamping bar in the parked state, and
   a set of guiding elements configured to guide movement of the respective clamping bar during transitions of the respective clamping bar between the parked state and the unparked state.

4. The clamping bar holder component of claim 3, wherein the clamping bar holding mechanism is a snap fit into which the respective clamping bar is snapped in the parked state.

5. The clamping bar holder component of claim 4, wherein the snap fit includes protrusions that are aligned with grooves in the respective clamping bar when the respective clamping bar is in the parked state.

6. The clamping bar holder component of claim 3, wherein each of the plurality of clamping bar holders includes:

a hole through which an attachment mechanism is configured to be used to secure the respective clamping bar to the endplate.

7. The clamping bar holder component of claim 6, wherein the attachment mechanism is a screw, a rivet or a piece of welded metal.

8. The clamping bar holder component of claim 1, further comprising:
at least one cooling manifold clip that is configured to secure a cooling manifold section of a cooling system for cooling the battery module.

9. The clamping bar holder component of claim 1, further comprising:
at least one hole that is arranged over at least one functional component integrated into the endplate of the battery module to permit access to the at least one functional component through the clamping bar holder component.

10. The clamping bar holder component of claim 9, wherein the at least one functional component corresponds to at least one cooling connection.

11. The clamping bar holder component of claim 1, further comprising:
at least one protector arranged over at least one functional component integrated into the endplate of the battery module, the at least one protector being configured to protect the at least one functional component from external contaminants and/or to block unauthorized personnel from accessing the at least one functional component.

12. The clamping bar holder component of claim 11, wherein the at least one protector includes an overpressure valve protector that is arranged over an overpressure valve integrated into the endplate of the battery module.

13. The clamping bar holder component of claim 1, wherein the clamping bar holder component is made from plastic.

14. The clamping bar holder component of claim 1, wherein the clamping bar holder component is attached to the endplate.

15. The clamping bar holder component of claim 1, wherein the clearance threshold for each clamping bar is a point to which each clamping bar can extend along a direction that is perpendicular to an insertion direction of the battery module into the battery module compartment without blocking insertion and/or removal of the battery module into and/or out of the battery module compartment.

16. The clamping bar holder component of claim 1, wherein the clamping bar holder component is configured to be secured to an exterior-facing side of the endplate such that the clamping bar holder component is accessible outside of the battery module compartment after the battery module is inserted into the battery module compartment.

17. A method of inserting a battery module into a battery module compartment, comprising:
configuring a clamping bar holder component that is secured to an endplate of the battery module such that a plurality of clamping bars are held in a plurality of clamping bar holders in a parked state, wherein the parked state for each clamping bar is characterized by the clamping bar being secured by a respective clamping bar holder inside of a respective clearance threshold outside of the battery module so as to permit the battery module to be inserted into a battery module compartment and/or to be removed from the battery module compartment;
inserting the battery module into the battery module compartment while each clamping bar remains in the parked state; and
transitioning, after the inserting, each clamping bar from the parked state to an unparked state, wherein the unparked state for each clamping bar is characterized by the clamping bar extending out of a respective clamping bar holder past the clearance threshold outside of the battery module so as to block removal of the battery module from the battery module compartment, and
wherein the transitioning is performed using an unparking tool that is configured to unsnap at least one clamping bar from at least one associated clamping bar holder.

18. The method of claim 17, further comprising:
applying, after the transitioning, an attachment mechanism between each clamping bar and the endplate to clamp the endplate to the battery module compartment.

19. The method of claim 18, wherein the attachment mechanism includes screws, rivets, pieces of welded metal or any combination thereof.

20. The method of claim 17, further comprising:
transitioning each clamping bar from the unparked state back to the parked state; and
removing the battery module from the battery module compartment after the transition of each clamping bar from the unparked state back to the parked state.

21. The method of claim 20, further comprising:
removing, during the transition of each clamping bar from the unparked state back to the parked state, an attachment mechanism between each clamping bar and the endplate to unclamp the endplate from the battery module compartment.

22. The method of claim 21, wherein the attachment mechanism includes screws, rivets, pieces of welded metal or any combination thereof.

* * * * *